US012462724B2

(12) United States Patent
Wang et al.

(10) Patent No.: US 12,462,724 B2
(45) Date of Patent: Nov. 4, 2025

(54) DISPLAY COMPENSATION METHOD, APPARATUS, AND DEVICE, MEDIUM, AND DISPLAY APPARATUS

(71) Applicant: KunShan Go-Visionox Opto-Electronics Co., Ltd, Jiangsu (CN)

(72) Inventors: Hongyu Wang, Kunshan (CN); Chong Han, Kunshan (CN); Shuangjia Li, Kunshan (CN)

(73) Assignee: KUNSHAN GO-VISIONOX OPTO-ELECTRONICS CO., LTD, Kunshan (CN)

( * ) Notice: Subject to any disclaimer, the term of this patent is extended or adjusted under 35 U.S.C. 154(b) by 0 days.

(21) Appl. No.: 18/969,685

(22) Filed: Dec. 5, 2024

(65) Prior Publication Data

US 2025/0104593 A1 Mar. 27, 2025

Related U.S. Application Data

(63) Continuation of application No. PCT/CN2022/122281, filed on Sep. 28, 2022.

(30) Foreign Application Priority Data

Jun. 28, 2022 (CN) ......................... 202210744996.1

(51) Int. Cl.
*G09G 3/20* (2006.01)

(52) U.S. Cl.
CPC ... *G09G 3/2007* (2013.01); *G09G 2320/0223* (2013.01); *G09G 2320/0233* (2013.01); *G09G 2360/16* (2013.01)

(58) Field of Classification Search
CPC ... G09G 2320/0223; G09G 2320/0233; G09G 2360/145; G09G 2360/16; G09G 3/006; G09G 3/2007
See application file for complete search history.

(56) References Cited

U.S. PATENT DOCUMENTS 10,283,071 B2 * 5/2019 Liu ...................... G09G 3/3696
11,210,982 B2 * 12/2021 Zheng ...................... G09G 3/20
(Continued)

FOREIGN PATENT DOCUMENTS

CN 103198801 A1 7/2013
CN 105654920 A 6/2016
(Continued)

OTHER PUBLICATIONS

Chinese Notification to Grant Patent Right for Invention, issued Sep. 5, 2023; in corresponding Chinese Application No. 202210744996.1, 6 pages.

(Continued)

*Primary Examiner* — Kenneth Bukowski
(74) *Attorney, Agent, or Firm* — Maier & Maier, PLLC

(57) ABSTRACT

A display compensation method, including: acquiring brightness parameters of two or more target grayscales of a display panel, and determining, based on the brightness parameters, target grayscales with consistent brightness trends and target grayscales with inconsistent brightness trends; determining a brightness trend consistency interval of grayscales according to the target grayscales with consistent brightness trends and the target grayscales with inconsistent brightness trends; calculating, for target grayscales in all grayscales of the display panel, a Demura compensation coefficient by using a Demura compensation algorithm; calculating, for target grayscales of the display panel that are within the brightness trend consistency interval, a uniformity compensation coefficient by using a uniformity compensation algorithm; writing the Demura compensation coefficient and the uniformity compensation coefficient into a driving integrated circuit (IC), to cause the driving IC to perform compensation according to the
(Continued)

Demura compensation coefficient and the uniformity compensation coefficient.

16 Claims, 7 Drawing Sheets

(56) References Cited

U.S. PATENT DOCUMENTS

| | | | | |
|---|---|---|---|---|
| 2016/0260381 | A1 | 9/2016 | Gai et al. | |
| 2017/0148382 | A1 | 5/2017 | Kuo et al. | |
| 2018/0082627 | A1* | 3/2018 | Deng | G09G 3/3208 |
| 2018/0166030 | A1* | 6/2018 | Liu | G09G 3/3696 |
| 2019/0237001 | A1* | 8/2019 | Lin | G09G 3/2044 |
| 2019/0385544 | A1* | 12/2019 | Tan | G09G 3/3607 |
| 2020/0193898 | A1* | 6/2020 | Wang | G09G 3/20 |
| 2023/0074524 | A1* | 3/2023 | Peng | G09G 3/2014 |
| 2024/0005887 | A1* | 1/2024 | Chen | G09G 3/3607 |

FOREIGN PATENT DOCUMENTS

| | | | | | |
|---|---|---|---|---|---|
| CN | 107316601 | A | | 11/2017 | |
| CN | 107799084 | A | | 3/2018 | |
| CN | 108269529 | A | | 7/2018 | |
| CN | 108510431 | A | | 9/2018 | |
| CN | 110085166 | A | | 8/2019 | |
| CN | 110310601 | A | * | 10/2019 | G09G 3/3225 |
| CN | 111009207 | A | | 4/2020 | |
| CN | 111968570 | A | | 11/2020 | |
| CN | 109686306 | B | | 12/2020 | |
| CN | 110992887 | B | | 3/2021 | |
| CN | 112581909 | A | | 3/2021 | |
| CN | 113362781 | A | | 9/2021 | |
| CN | 114203087 | A | | 3/2022 | |
| CN | 114333675 | A | | 4/2022 | |
| CN | 114783351 | A | * | 7/2022 | G09G 3/30 |
| CN | 115083328 | A | | 9/2022 | |

OTHER PUBLICATIONS

International Search Report issued Dec. 12, 2022, in corresponding International Application No. PCT/CN202/122281; 6 pages.

Extended Search Report issued on Aug. 26, 2025, in corresponding European Application No. 22948975.2, 12 pages.

* cited by examiner

DISPLAY COMPENSATION METHOD, APPARATUS, AND DEVICE, MEDIUM, AND DISPLAY APPARATUS

CROSS-REFERENCE TO RELATED APPLICATIONS

This application is a continuation of International Application No. PCT/CN2022/122281, filed on Sep. 28, 2022, which claims priority to Chinese Patent Application No. 202210744996.1, entitled "DISPLAY COMPENSATION METHOD, APPARATUS, AND DEVICE, MEDIUM, AND DISPLAY APPARATUS" and filed on Jun. 28, 2022, the entire contents of which are incorporated herein by reference.

TECHNICAL FIELD

The present application belongs to the technical field of display, and in particular, to a display compensation method, apparatus, and device, a medium, and a display apparatus.

BACKGROUND

With the rapid development of display technologies, various requirements for display panels have gradually increased, causing a display panel manufacturing process to be more complex and difficult. The complexity and difficulty of the manufacturing process may easily cause large differences in optical properties of the display panels. The differences in the optical properties of the display panels may lead to poor uniformity of display of the display panels.

Therefore, there is an urgent need for a display compensation method that can improve the uniformity of display of the display panels.

SUMMARY

Embodiments of the present application provide a display compensation method, apparatus, and device, a medium, and a display apparatus.

In a first aspect, an embodiment of the present application provides a display compensation method, including: acquiring brightness parameters of two or more target grayscales in all grayscales of a display panel, and determining, based on the brightness parameters, target grayscales with consistent brightness trends and target grayscales with inconsistent brightness trends; determining a brightness trend consistency interval of all the grayscales according to the target grayscales with consistent brightness trends and the target grayscales with inconsistent brightness trends; calculating, for target grayscales in all the grayscales of the display panel, a Demura compensation coefficient by using a Demura compensation algorithm; calculating, for target grayscales of the display panel that are within the brightness trend consistency interval, a uniformity compensation coefficient by using a uniformity compensation algorithm; and writing the Demura compensation coefficient and the uniformity compensation coefficient into a driving integrated circuit, to cause the driving integrated circuit to read the Demura compensation coefficient and the uniformity compensation coefficient according to a displayed grayscale to perform compensation.

In a second aspect, an embodiment of the present application provides a display compensation method, applied to a driving integrated circuit in a display apparatus, the driving integrated circuit storing the Demura compensation coefficient and the uniformity compensation coefficient obtained by the display compensation method in the first aspect, the method including: determining the displayed grayscale based on a display signal; reading, in a case where the displayed grayscale includes a grayscale within the brightness trend consistency interval, the Demura compensation coefficient and the uniformity compensation coefficient that are stored, and compensating for the display signal according to the displayed grayscale, the Demura compensation coefficient, and the uniformity compensation coefficient; and reading, in a case where the displayed grayscale does not include the grayscale within the brightness trend consistency interval, the stored Demura compensation coefficient, and compensating for the display signal according to the displayed grayscale and the Demura compensation coefficient.

In a third aspect, an embodiment of the present application provides a display compensation apparatus, including: a consistency determination module configured to acquire brightness parameters of two or more target grayscales in all grayscales of a display panel, and determine, based on the brightness parameters, target grayscales with consistent brightness trends and target grayscales with inconsistent brightness trends; an interval determination module configured to determine a brightness trend consistency interval of all the grayscales according to the target grayscales with consistent brightness trends and the target grayscales with inconsistent brightness trends; a first calculation module configured to calculate, for target grayscales in all the grayscales of the display panel, a Demura compensation coefficient by using a Demura compensation algorithm; a second calculation module configured to calculate, for target grayscales of the display panel that are within the brightness trend consistency interval, a uniformity compensation coefficient by using a uniformity compensation algorithm; and an input module configured to write the Demura compensation coefficient and the uniformity compensation coefficient into a driving integrated circuit, to cause the driving integrated circuit to read the Demura compensation coefficient and the uniformity compensation coefficient according to a displayed grayscale to perform compensation.

In a fourth aspect, an embodiment of the present application provides a display compensation device, including: a processor and a memory storing computer program instructions; the processor, when executing the computer program instructions, implementing the display compensation method in the first aspect.

In a fifth aspect, an embodiment of the present application provides a display apparatus, including: a driving integrated circuit, the driving integrated circuit storing the Demura compensation coefficient and the uniformity compensation coefficient obtained by the display compensation method in the first aspect, and the driving integrated circuit being configured to read the Demura compensation coefficient and the uniformity compensation coefficient to perform the display compensation method in the second aspect.

In a sixth aspect, an embodiment of the present application provides a computer-readable storage medium having stored computer program instructions thereon, wherein the computer program instructions, when executed by a processor, implement the display compensation method in the first aspect or the display compensation method in the second aspect.

DETAILED DESCRIPTION

Figure 1:
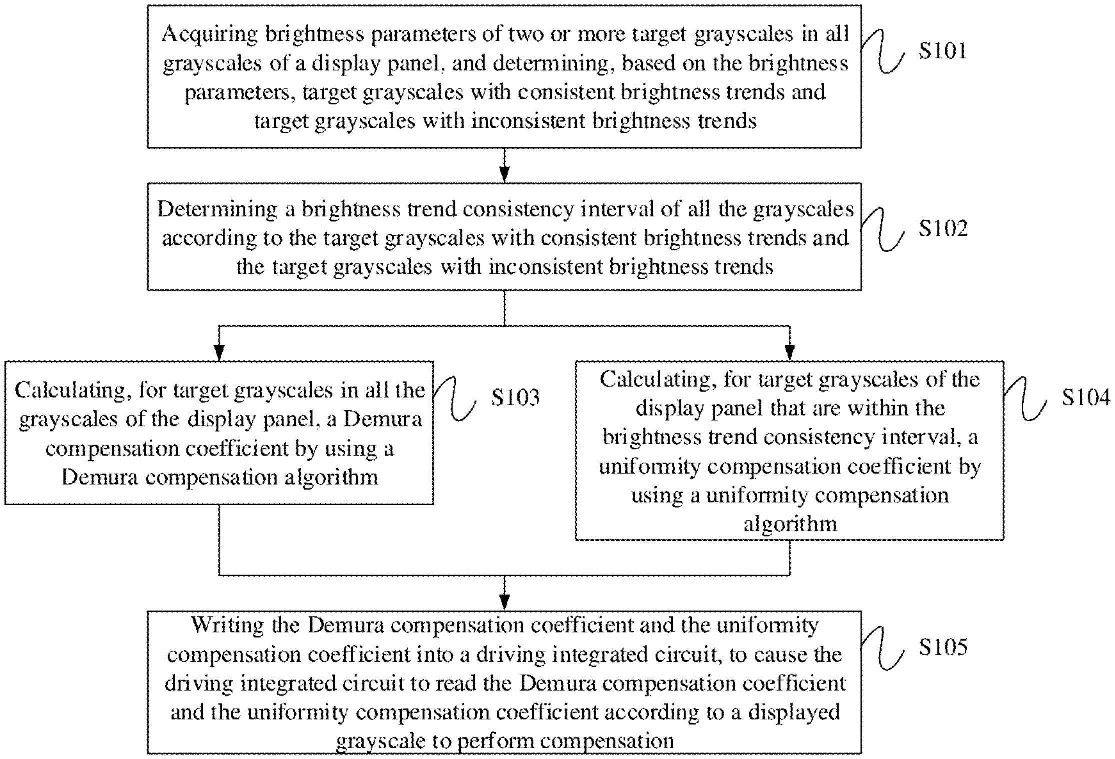
FIG. 1 is a flowchart of a display compensation method according to an embodiment of the present application.

Features and exemplary embodiments of various aspects of the present application will be described in detail below. In order to make the objectives, technical solutions, and advantages of the present application clearer, the present application will be further described in detail below in conjunction with the accompanying drawings and specific embodiments. It should be understood that the specific embodiments described herein are only intended to explain the present application, but not to limit the present application. For those skilled in the art, the present application may be implemented without some of these specific details. The following description of embodiments is merely intended to provide a better understanding of the present application by illustrating examples of the present application.

With the rapid development of display technologies, various requirements for display panels have gradually increased, causing a display panel manufacturing process to be more complex and difficult. The complexity and difficulty of the manufacturing process may easily cause large differences in optical properties of the display panels. The differences in the optical properties of the display panels may lead to poor uniformity of display of the display panels. In order to improve uniformity, Demura compensation and uniformity compensation for voltage drop (IR drop) may be used for compensation to improve the uniformity of display of the display panels. Demura compensation refers to, after a display panel is lighted up, photographing the display panel, acquiring display brightness of the display panel, determining a Mura area of the display panel according to the display brightness, and processing the Mura area to eliminate Mura. Uniformity compensation for IR drop refers to, after the display panel is lighted up, dividing the display panel into a plurality of areas for photographing, obtaining display brightness of the areas of the display panel, and when the brightness of the plurality of areas has a large difference, reducing the display brightness of the area with extremely high brightness, and/or increasing the display brightness of the area with extremely low brightness. However, during actual operation, uniformity of display after compensation in the two compensation manners has not been greatly improved. The inventor has found through research that Demura compensation and uniformity compensation may weaken each other, so that uniformity of display after compensation in the two compensation manners has not been greatly improved, and the uniformity of display of the display panel is still poor.

According to the display compensation method, apparatus, and device, the medium, and the display apparatus provided in the present application, target grayscales with consistent brightness trends and target grayscales with inconsistent brightness trends can be determined according to brightness parameters of the display panel at different grayscales. A grayscale interval with consistent brightness trends and a grayscale interval with inconsistent brightness trends of the display panel may be determined according to the target grayscales with consistent brightness trends and the target grayscales with inconsistent brightness trends. In the grayscale interval with inconsistent brightness trends, compensation effects of Demura compensation and uniformity compensation may cancel each other out. Therefore, Demura compensation and uniformity compensation are adopted for compensation only when grayscales are within the grayscale interval with consistent brightness trends, and only Demura compensation is adopted for compensation in the grayscale interval with inconsistent brightness trends, which prevents mutual cancellation of the effects of the two compensation manners, thereby improving uniformity of display of the display panel.

The display compensation method, apparatus, and device, the medium, and the display apparatus provided in the present application are described below respectively.

In a first aspect of the present application, a display compensation method is provided. The display compensation method may be applied to a display compensation apparatus or a display compensation device such as an upper computer. That is, the display compensation method may be performed by a display compensation apparatus or a display compensation device such as an upper computer, which is not limited herein. FIG. 1 shows a display compensation method according to an embodiment of the present application. As shown in FIG. 1, the display compensation method may include step S101 to step S105.

In step S101, brightness parameters of two or more target grayscales in all grayscales of a display panel are acquired, and target grayscales with consistent brightness trends and target grayscales with inconsistent brightness trends are determined based on the brightness parameters.

During compensation for the display panel, two or more grayscales may be selected from all the grayscales to acquire brightness parameters of the display panel at the selected two or more grayscales. The selected grayscales are target grayscales. A number of the target grayscales may be set according to an actual application scenario, a requirement, experience, or the like. For example, the number of the target grayscales is set in consideration of a balance between accuracy and implementation efficiency, which is not limited herein. In some examples, the target grayscales may include a selected grayscale to be specified for performing uniformity compensation on the display panel and a selected grayscale to be specified for performing Demura compensation on the display panel. Herein, the selected grayscale to be specified may be set according to a specific scenario, a requirement, experience, or the like, which is not limited herein. In some examples, the target grayscales may include part of selected grayscales to be specified for performing uniformity compensation on the display panel and part of selected grayscales to be specified for performing Demura compensation on the display panel. For example, a display screen has 256 grayscales, that is, 0 to 255. The target grayscales may include a maximum grayscale of the display screen and a maximum grayscale among grayscales specified for photographing during Demura compensation. The maximum grayscale of the display screen is 255. If grayscales specified for photographing during Demura compensation include 224, 192, 128, 64, 32, and 16, the maximum grayscale among the grayscales specified for photographing during Demura compensation of the display panel is 224. Correspondingly, the target grayscales may include 255 and 224. On the basis of the fact that the target grayscales include 255 and 224, the target grayscales may also include other grayscales, which is not limited herein.

The brightness parameters are used to represent brightness and may include brightness, relative brightness, or other parameters that may represent brightness. In some examples, the brightness parameters may be obtained by photographing the display panel at the target grayscales. Brightness trends of the display panel may be determined based on the brightness parameters. The brightness trends may represent brightness distribution trends. At different target grayscales, the brightness trends of the display panel may be consistent or inconsistent. Whether a brightness trend of each target grayscale is consistent may be determined according to a brightness parameter of the target grayscale. If the brightness trend of the target grayscale is consistent, the target grayscale is a target grayscale with a consistent brightness trend. If the brightness trend of the target grayscale is inconsistent, the target grayscale is a target grayscale with an inconsistent brightness trend.

Whether the brightness trend of the target grayscale is consistent may mean whether brightness trends of different target grayscales are consistent, which may be determined through brightness distribution of the different target grayscales. For example, when the target grayscale displayed on the display panel is 255, the brightness of the display panel gradually decreases from top to bottom, and when the target grayscale displayed on the display panel is 224, the brightness of the display panel gradually decreases from top to bottom. That is, a brightness trend of the target grayscale 224 of the display panel is consistent with that of the target grayscale 255 of the display panel. It may be considered that the brightness trend of the target grayscale 224 of the display panel is consistent. That is, the target grayscale 224 is a target grayscale with a consistent brightness trend. In another example, when the target grayscale displayed on the display panel is 255, the brightness of the display panel gradually decreases from top to bottom, and when the target grayscale displayed on the display panel is 128, the brightness of the display panel gradually increases from top to bottom. That is, a brightness trend of the target grayscale 128 of the display panel is inconsistent with that of the target grayscale 255 of the display panel. It may be considered that the brightness trend of the target grayscale 128 of the display panel is inconsistent. That is, the target grayscale 128 is a target grayscale with an inconsistent brightness trend.

Whether the brightness trend of the target grayscale is consistent may also mean whether brightness trends of different display colors at a same target grayscale are consistent, which may be determined through brightness distribution of the different display colors at the same target grayscale. For example, when the target grayscale displayed on the display panel is 255, the brightness of the display panel gradually decreases from top to bottom when the display panel displays white, and the brightness of the display panel gradually decreases from top to bottom when the display panel displays green, blue, and red respectively. That is, a brightness trend of the display panel displaying white at the target grayscale 255 is consistent with that of the display panel displaying green, blue, and red. It may be considered that the brightness trend of the target grayscale 255 of the display panel is consistent. That is, the target grayscale 255 is a target grayscale with a consistent brightness trend. For example, when the target grayscale displayed on the display panel is 192, the brightness of the display panel gradually decreases from top to bottom when the display panel displays white, and the brightness of the display panel gradually increases from top to bottom when the display panel displays green, blue, and red respectively. That is, a brightness trend of the display panel displaying white at the target grayscale 192 is inconsistent with that of the display panel displaying green, blue, and red. It may be considered that the brightness trend of the target grayscale 192 of the display panel is inconsistent. That is, the target grayscale 192 is a target grayscale with an inconsistent brightness trend.

Whether the brightness trend of the target grayscale is consistent may alternatively be jointly determined based on a target grayscale and a display color. If brightness trends respectively corresponding to the target grayscale and the display color are consistent, it may be considered that the brightness trend of the target grayscale is consistent. If the brightness trend corresponding to at least one of the target grayscale and the display color is inconsistent, it may be considered that the brightness trend of the target grayscale is inconsistent.

In step S102, a brightness trend consistency interval of all the grayscales is determined according to the target grayscales with consistent brightness trends and the target grayscales with inconsistent brightness trends.

A grayscale interval with continuous and consistent brightness trends and a grayscale interval with continuous and inconsistent brightness trends may be determined according to the target grayscales with consistent brightness trends and the target grayscales with inconsistent brightness trends. An interval with continuous and consistent brightness trends may be taken as the brightness trend consistency interval. In all the grayscales, other grayscale intervals except the brightness trend consistency interval are non-brightness trend consistency intervals.

In step S103, for target grayscales in all the grayscales of the display panel, a Demura compensation coefficient is calculated by using a Demura compensation algorithm.

All the grayscales include grayscales 0 to 255. The target grayscales in all the grayscales are all selected target grayscales. Various target grayscales displayed on the display panel may be photographed, to collect brightness parameters. The Demura compensation coefficient is calculated according to the collected brightness parameters and an expected brightness parameter of Demura compensation, or Mura signal filtering may be performed on the collected brightness parameters, extracted point-type Mura, line-type Mura, and the like may be filtered out to calculate the Demura compensation coefficient, and positions corresponding to the point-type Mura, the line-type Mura, and the like are displayed and restored. The Demura compensation coefficient may be used to participate in Demura compensation calculation of any grayscale of the display panel, thereby performing Demura compensation on display of the display panel at any grayscale. The Demura compensation coefficient may be a product coefficient or an offset, which is not limited herein.

In step S104, for target grayscales of the display panel that are within the brightness trend consistency interval, a uniformity compensation coefficient is calculated by using a uniformity compensation algorithm.

In a case where a grayscale of the display panel is within a non-brightness trend consistency interval, that is, an interval with inconsistent brightness trends, the compensation effects of Demura compensation and uniformity compensation may cancel each other out. The uniformity compensation herein mainly refers to voltage drop uniformity compensation (that is, IR drop uniformity compensation). In this embodiment of the present application, after the brightness trend consistency interval is determined, uniformity compensation is only used for grayscales in the brightness trend consistency interval, and uniformity compensation is not used for grayscales within the non-brightness trend consistency interval. Correspondingly, for the target grayscales within the brightness trend consistency interval, brightness parameters of the display panel are collected, and the uniformity compensation coefficient may be calculated according to the brightness parameters and an expected brightness parameter of uniformity compensation. The uniformity compensation coefficient may be used to participate in uniformity compensation calculation of any grayscale of the display panel within the brightness trend consistency interval, thereby performing uniformity compensation on display of the display panel at any grayscale in the brightness trend consistency interval.

In step S105, the Demura compensation coefficient and the uniformity compensation coefficient are written into a driving integrated circuit (IC), to cause the driving integrated circuit to read the Demura compensation coefficient and the uniformity compensation coefficient according to a displayed grayscale to perform compensation.

After the Demura compensation coefficient and the uniformity compensation coefficient are obtained, the Demura compensation coefficient and the uniformity compensation coefficient may be programmed into a driving integrated circuit of a display apparatus. If the grayscale displayed on the display panel include a grayscale within the brightness trend consistency interval, the display panel reads the Demura compensation coefficient and the uniformity compensation coefficient and uses the grayscale displayed on the display panel, the Demura compensation coefficient, and the uniformity compensation coefficient to perform Demura compensation and uniformity compensation. Uniformity compensation only acts on the grayscale within the brightness trend consistency interval. If the grayscale displayed on the display panel does not include the grayscale within the brightness trend consistency interval, the display panel reads the Demura compensation coefficient and uses the grayscale displayed on the display panel and the Demura compensation coefficient to perform Demura compensation.

In this embodiment of the present application, brightness parameters of a plurality of target grayscales of a display panel may be acquired, and target grayscales with consistent brightness trends and target grayscales with inconsistent brightness trends are determined based on the brightness parameters. A brightness trend consistency interval of grayscales is determined according to the target grayscales with consistent brightness trends and the target grayscales with inconsistent brightness trends. For target grayscales in all the grayscales of the display panel, a Demura compensation coefficient is calculated by using a Demura compensation algorithm. For target grayscales of the display panel that are within the brightness trend consistency interval, a uniformity compensation coefficient is calculated by using a uniformity compensation algorithm. The Demura compensation coefficient and the uniformity compensation coefficient are written into the driving integrated circuit. The Demura compensation coefficient acts on all the grayscales displayed on the display panel, that is, Demura compensation may compensate for all the grayscales displayed on the display panel; the uniformity compensation coefficient only acts on the grayscales displayed on the display panel that are within the brightness trend consistency interval, that is, uniformity compensation may only compensate for the grayscales displayed on the display panel that are within the brightness trend consistency interval, thereby preventing mutual cancellation of compensation effects of Demura compensation and uniformity compensation and improving uniformity of the display panel.

When the compensation effect is effective, uniformity compensation can compensate for uniformity problems caused by IR drop. When the compensation effect is effective, Demura compensation can restore and compensate for Mura of the display panel on the one hand, and can also compensate for uniformity on the other hand. In a case where the compensation effect of uniformity compensation and the compensation effect of Demura compensation may not cancel each other out, the uniformity of the display panel can be improved.

Compared with the method of always using Demura compensation and uniformity compensation at the same time, the display compensation method provided in this embodiment of the present application greatly improves the uniformity of the display panel. In a same number of display panels, a percentage of display panels, whose uniformity meets a standard, compensated for by using the display compensation method provided in this embodiment of the present application can be increased by 21.4% or higher compared with that by using the method of always using Demura compensation and uniformity compensation at the same time. Uniformity detection is performed on the display panel after compensation, and a plurality of areas are selected from the display area of the display panel for uniformity detection. For same display panels, an average value, a minimum value, and a maximum value of uniformity of the plurality of areas compensated for by using the display compensation method provided in this embodiment of the present application are higher than those by using the method of always using Demura compensation and uniformity compensation at the same time. As can be seen from the above, the display compensation method provided in this embodiment of the present application can greatly improve the uniformity of the display panel.

Figure 2:
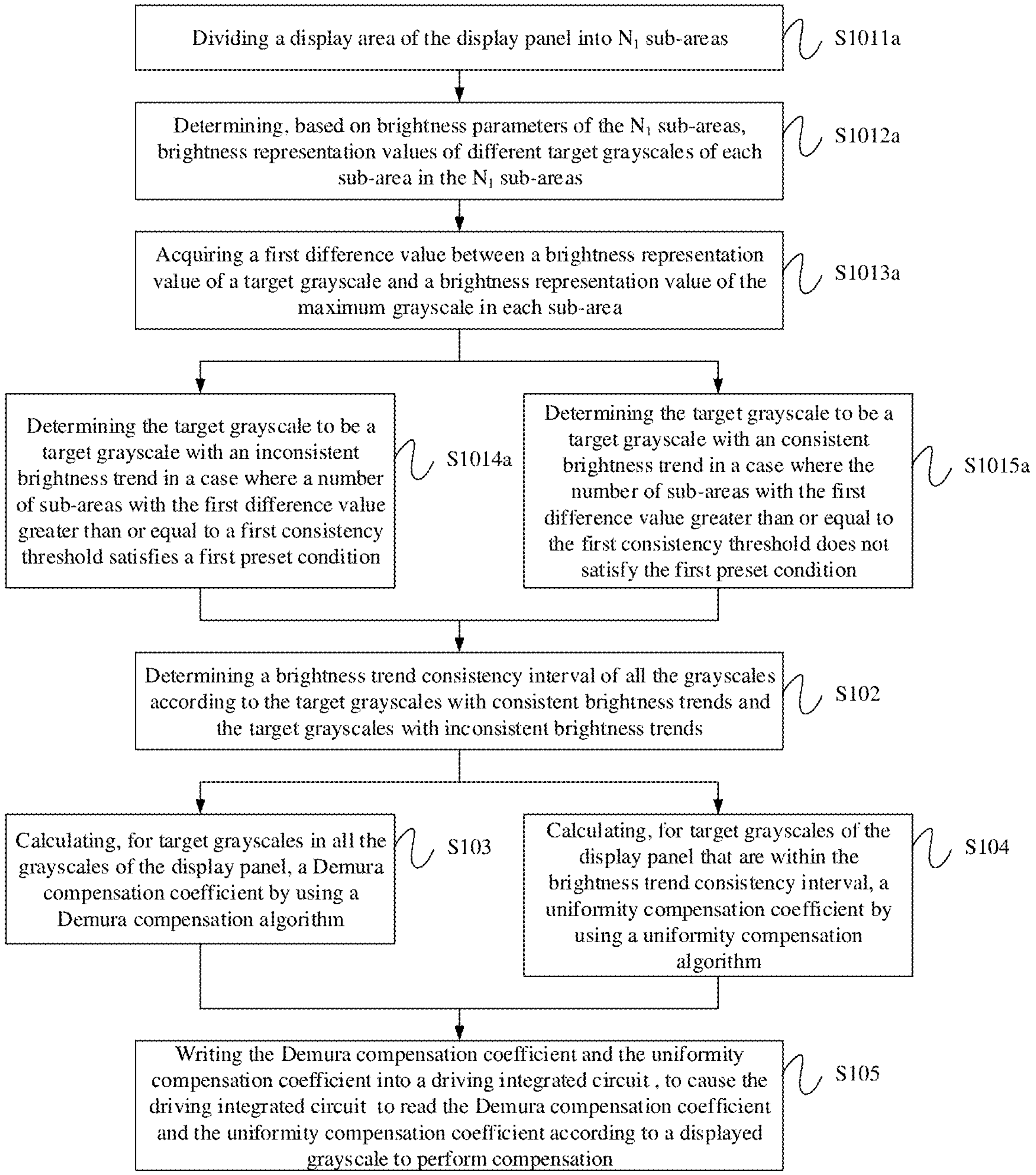
FIG. 2 is a flowchart of a display compensation method according to another embodiment of the present application.

In some embodiments, the display area of the display panel may be divided into two or more sub-areas, and whether the brightness trend of the target grayscale is consistent is determined by comparing each sub-area at different grayscales. FIG. 2 shows a display compensation method according to another embodiment of the present application. FIG. 2 is different from FIG. 1 in that step S101 in FIG. 1 may be specifically refined into step S1011*a* to step S1015*a*.

In step S1011*a*, a display area of the display panel is divided into $N_1$ sub-areas.

$N_1$ is an integer greater than or equal to 2. Sizes and shapes of the $N_1$ sub-areas may be the same or different, which are not limited herein.

In step S1012*a*, brightness representation values of different target grayscales of each sub-area in the $N_1$ sub-areas are determined based on brightness parameters of the $N_1$ sub-areas.

The brightness parameters of the $N_1$ sub-areas are acquired at different target grayscales. Under normal circumstances, the brightness parameters of the display panel may alternatively vary with different grayscales. In order to make brightness parameters of different target grayscales comparable, the brightness parameters may be processed to obtain brightness representation values. The brightness representation values are used to represent brightness, and brightness representation values at different target grayscales are comparable. Whether brightness trends of the target grayscales are consistent may be determined by comparing the brightness representation values.

The brightness representation value of one sub-area may be determined according to the brightness parameter of the sub-area and a reference brightness parameter corresponding to the target grayscale. For example, a ratio of the brightness parameter of the sub-area to the reference brightness parameter corresponding to the target grayscale may be taken as the brightness representation value of the sub-area.

In some examples, the reference brightness parameter may include a pre-specified brightness parameter. Reference brightness parameters corresponding to different target grayscales may be different. For example, a reference brightness parameter of an executable grayscale 255 is Lv, and reference brightness parameters L' corresponding to other target grayscales may be calculated according to the following formula (1):

$$L' = Lv \times (x/255)^{\gamma} \quad (1)$$

where x denotes a target grayscale, and γ denotes a gamma coefficient. A brightness representation value of a sub-area at a target grayscale may be a ratio of a brightness parameter of the sub-area at the target grayscale to a reference brightness parameter corresponding to the target grayscale.

Figure 3:
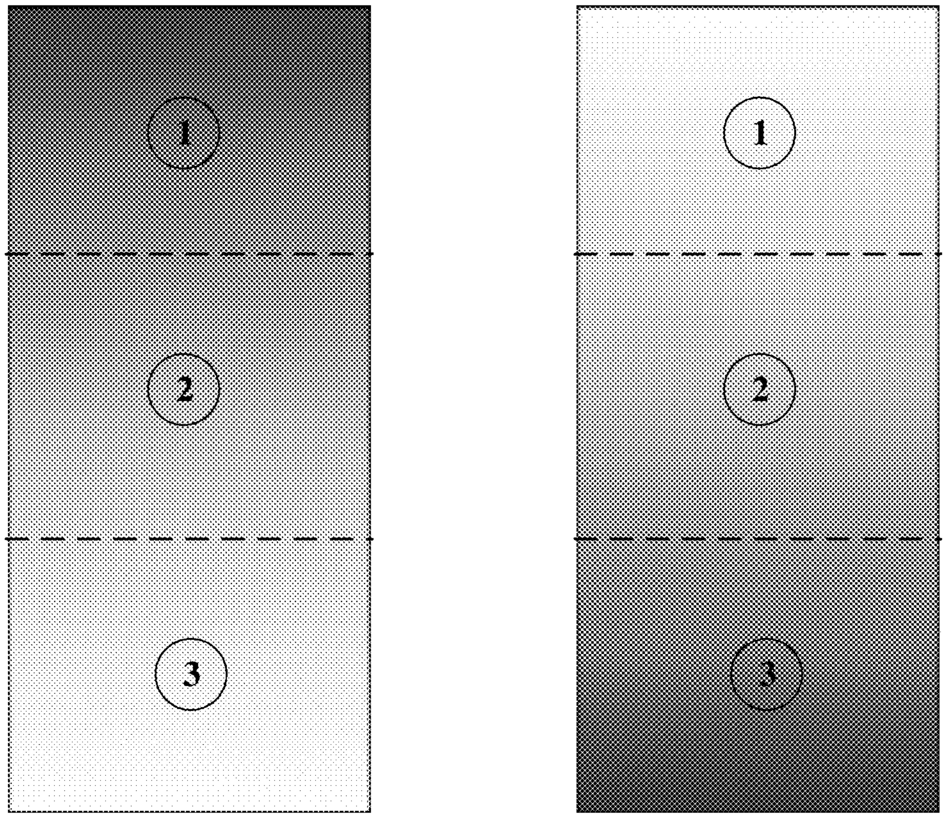
FIG. 3 is a schematic diagram of division into sub-areas according to an embodiment of the present application.

In some examples, the reference brightness parameter may include a brightness parameter of any of the sub-areas. A brightness representation value of a sub-area at a target grayscale may be a ratio of a brightness parameter of the sub-area at the target grayscale to a brightness parameter of any sub-area at the target grayscale. For example, FIG. 3 is a schematic diagram of division into sub-areas according to an embodiment of the present application. The left figure in FIG. 3 shows a display area at the target grayscale 255, and the right figure in FIG. 3 shows a display area at the target grayscale 224. The display area is divided into three sub-areas. The three sub-areas are marked as ①, ②, and ③ in FIG. 3. A brightness parameter of the sub-area ② at each target grayscale may be selected as the reference brightness parameter, and then a brightness representation value of the sub-area ② at each target grayscale is 1.

In step S1013*a*, a first difference value between a brightness representation value of a target grayscale and a brightness representation value of the maximum grayscale in each sub-area is acquired.

The target grayscales include a maximum grayscale. The maximum grayscale is 255. In order to ensure a more accurate determination of whether the brightness trends of the target grayscales are consistent, there is a need to select one grayscale as a reference grayscale. In this embodiment of the present application, the maximum grayscale 255 is selected as the reference grayscale. The first difference value is used to represent a difference between a brightness representation value of a target grayscale and a brightness representation value of the maximum grayscale in a sub-area. The first difference value may be an absolute value of the difference between the brightness representation value of the target grayscale and the brightness representation value of the maximum grayscale in the sub-area or a ratio of the absolute value of the difference to the brightness representation value of the maximum grayscale, which is not limited herein. For ease of description, the absolute value of the difference between the brightness representation value of the target grayscale and the brightness representation value of the maximum grayscale in the sub-area is herein referred to as a target absolute value.

In step S1014*a*, the target grayscale is determined to be a target grayscale with an inconsistent brightness trend in a case where a number of sub-areas with the first difference value greater than or equal to a first consistency threshold satisfies a first preset condition.

The first consistency threshold is a judgment threshold for judging whether brightness trends of a single sub-area at different grayscales are consistent. If the first difference value is greater than or equal to the first consistency threshold, it indicates that the brightness trends of the sub-area are inconsistent. However, to determine whether an overall brightness trend of the display area of the display panel at a target grayscale is consistent, there is a need to further refer to a number of sub-areas with inconsistent brightness trends. The first preset condition includes a determination condition indicating that the overall brightness trend of the display area of the display panel at the target grayscale is inconsistent, which is related to the number of sub-areas with inconsistent brightness trends. For example, the first preset condition includes the number of sub-areas with the first difference value greater than or equal to the first consistency threshold being greater than or equal to a first number threshold. The first number threshold may be set according to a scenario, a requirement, experience, or the like, which is not limited herein. For example, the first number threshold is 1 or another positive integer. In another example, the first preset condition includes a proportion of the number of sub-areas with the first difference value greater than or equal to the first consistency threshold to a total number of sub-areas being greater than or equal to a first proportion threshold. The first proportion threshold may be set according to a scenario, a requirement, experience, or the like, which is not limited herein. For example, the first proportion threshold may be ⅓, ⅖, or the like. If the number of sub-areas with the first difference value greater than or equal to the first consistency threshold satisfies the first preset condition, it indicates that the overall brightness trend of the display area of the display panel at the target grayscale is inconsistent, and it may be considered that the target grayscale is a target grayscale with an inconsistent brightness trend.

In step S1015*a*, the target grayscale is determined to be a target grayscale with a consistent brightness trend in a case where the number of sub-areas with the first difference value greater than or equal to the first consistency threshold does not satisfy the first preset condition.

If the number of sub-areas with the first difference value greater than or equal to the first consistency threshold does not satisfy the first preset condition, it indicates that the overall brightness trend of the display area of the display panel at the target grayscale is consistent, and it may be considered that the target grayscale is a target grayscale with a consistent brightness trend.

For example, if distribution of sub-areas is as shown in FIG. 3, the left figure in FIG. 3 shows a display area at a target grayscale which is a maximum grayscale, that is, grayscale 255, and the right figure in FIG. 3 shows a display area at the target grayscale 224. On the assumption that brightness representation values of the sub-areas ①, ②, and ③ in the left figure of FIG. 3 are 0.95, 1.00, and 1.08 respectively, brightness representation values of the sub-areas ①, ② and ③ in the right figure of FIG. 3 are 1.05, 1.00, and 0.94 respectively, the first difference value is a ratio of an absolute value of a difference between the brightness representation value of the target grayscale and the brightness representation value of the maximum grayscale in the sub-area to the brightness representation value of the maximum grayscale, the first consistency threshold is 8%, the first preset condition includes a proportion of the number of sub-areas with the first difference value greater than or equal to the first consistency threshold to a total number of sub-areas being greater than or equal to a first proportion threshold, and the first proportion threshold is 1/3, a first difference value corresponding to the sub-area ① is |1.05−0.95|/0.95=10.5%, the first difference value corresponding to the sub-area ① is greater than the first consistency threshold 8%, a first difference value corresponding to the sub-area ③ is |0.94−1.08|/1.08-12.96%, a first difference value corresponding to the sub-area ③ is greater than the first consistency threshold 8%, the proportion of the number of sub-areas with the first difference value greater than or equal to the first consistency threshold to the total number of sub-areas is ⅔, which is greater than the first proportion threshold ⅓, and the target grayscale 224 may be determined to be a target grayscale with an inconsistent brightness trend.

In the above embodiments, for the maximum grayscale of the display panel, brightness parameters of each sub-area of the display panel may be collected when different colors are displayed at the maximum grayscale, brightness representation values of different display colors of each sub-area at the maximum grayscale are determined according to the brightness parameters, and whether the maximum grayscale is a target grayscale with a consistent brightness trend is determined through comparison between difference values between brightness representation values of different display colors in a same sub-area at the maximum grayscale and a consistency threshold, a number of sub-areas whose difference values are greater than or equal to the consistency threshold, and a preset condition. The difference values, the consistency threshold, and the preset condition may be obtained with reference to the related content of the first difference value, the first consistency threshold, and the first preset condition in the above embodiments, but the difference values, the consistency threshold, and specific values in the preset condition may be different from those of the first difference value, the first consistency threshold, and the first preset condition in the above embodiments.

The display area of the display panel is divided into a plurality of sub-areas, and whether an overall brightness trend of the display panel is consistent is judged through brightness trends of the sub-areas, which can improve accuracy of determination of whether the overall brightness trend of the display panel is consistent, to improve accuracy of a brightness trend consistency interval subsequently obtained and improve compensation accuracy, thereby further improving the uniformity of display of the display panel.

Figure 4:
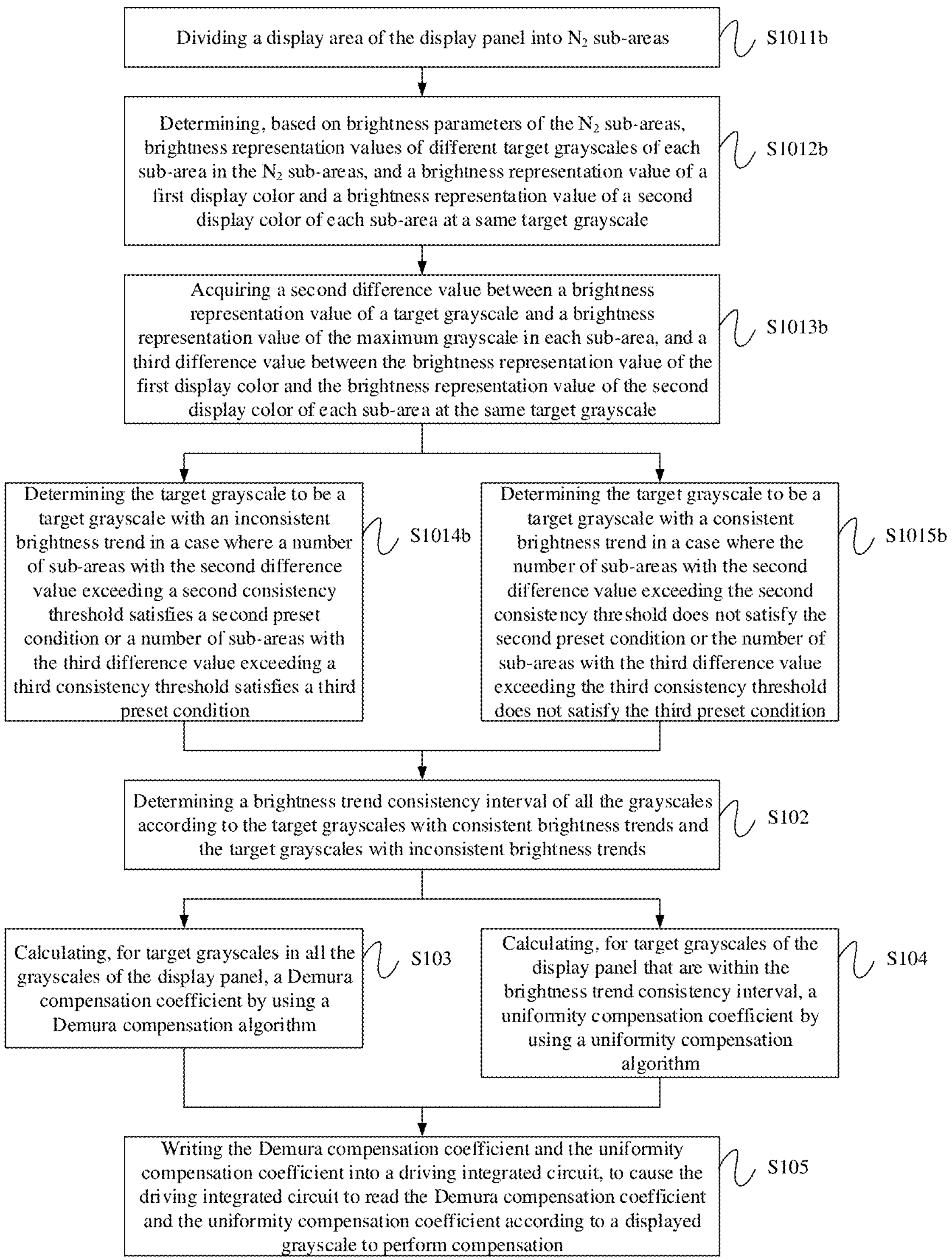
FIG. 4 is a flowchart of a display compensation method according to yet another embodiment of the present application.

In some embodiments, the display area of the display panel may be divided into two or more sub-areas, and whether the brightness trend of the target grayscale is consistent is determined by comparing a same sub-area at different grayscales and in different colors at different grayscales. FIG. 4 shows a display compensation method according to yet another embodiment of the present application. FIG. 4 is different from FIG. 1 in that step S101 in FIG. 1 may be specifically refined into step S1011*b* to step S1015*b*.

In step S1011*b*, a display area of the display panel is divided into $N_2$ sub-areas.

$N_2$ is an integer greater than or equal to 2. $N_2$ and $N_1$ may be equal or unequal. Specific content of the division into the sub-areas may be obtained with reference to the related description in the above embodiments, which is not described in detail herein again.

In step S1012*b*, brightness representation values of different target grayscales of each sub-area in the $N_2$ sub-areas, and a brightness representation value of a first display color and a brightness representation value of a second display color of each sub-area at a same target grayscale are determined based on brightness parameters of the $N_2$ sub-areas.

The brightness parameters of the $N_2$ sub-areas are acquired at different target grayscales. The target grayscales include a maximum grayscale. The brightness parameters of the $N_2$ sub-areas are acquired in different display colors at each target grayscale. For example, the display colors include white, red, green, and blue, and brightness parameters of $N_2$ sub-areas displaying white, brightness parameters of $N_2$ sub-areas displaying red, brightness parameters of $N_2$ sub-areas displaying green, and brightness parameters of $N_2$ sub-areas displaying blue at each target grayscale may be acquired.

Specific content of the brightness representation values of different target grayscales of a same sub-area may be obtained with reference to the related description in the above embodiments, which is not described in detail herein again.

In some examples, the first display color is white, and the second display color is at least one of red, green, and blue. In general, brightness trends of the entire display panel and sub-areas corresponding to red, green, and blue are the same. For example, if an overall brightness trend of the display panel corresponding to red is consistent, and an overall brightness trend of the display panel corresponding to green is also consistent, and an overall brightness trend of the display panel corresponding to blue is also consistent. In order to further speed up the acquisition of the brightness trend consistency interval, one of red, green, and blue may be selected as the second display color.

The brightness parameters of the display panel may vary with different display colors. In order to make brightness parameters of different display colors at a same target grayscale comparable, the brightness parameters may be processed to obtain brightness representation values. The brightness representation values are used to represent brightness, and brightness representation values of different display colors are comparable. Comparison between the brightness representation values of the different display colors at the same target grayscale may also help determine whether the target grayscale is a target grayscale with a consistent brightness trend.

The brightness representation value of the first display color and the brightness representation value of the second display color may be determined according to the brightness parameter of the sub-area and a reference brightness parameter corresponding to the target grayscale. Specific content may be obtained with reference to the related description of the brightness representation value in the above embodiments, which is not described in detail herein again.

In step S1013*b*, a second difference value between a brightness representation value of a target grayscale and a brightness representation value of the maximum grayscale in each sub-area, and a third difference value between the brightness representation value of the first display color and the brightness representation value of the second display color of each sub-area at the same target grayscale are acquired.

Specific content of the second difference value between the brightness representation value of the target grayscale and the brightness representation value of the maximum grayscale in the sub-area may be obtained with reference to the related description of the first difference value in the above embodiments, which is not described in detail herein again.

In this embodiment, in addition to determining the overall brightness trend of the display panel with the assistance of brightness trends of each sub-area at different grayscales, the overall brightness trend of the display panel may also be determined with the assistance of brightness trends of each sub-area at a same target grayscale but in different display colors.

The third difference value is used to represent a difference between the brightness representation value of the first display color and the brightness representation value of the second display color displayed in the sub-area. The third difference value may be an absolute value of the difference between the brightness representation value of the first display color and the brightness representation value of the second display color displayed in the sub-area or a ratio of the absolute value of the difference to the brightness representation value of the first display color displayed, which is not limited herein.

In step S1014*b*, the target grayscale is determined to be a target grayscale with an inconsistent brightness trend in a case where a number of sub-areas with the second difference value exceeding a second consistency threshold satisfies a second preset condition or a number of sub-areas with the third difference value exceeding a third consistency threshold satisfies a third preset condition.

Specific content of the number of sub-areas with the second difference value exceeding the second consistency threshold satisfying the second preset condition may be obtained with reference to the related description in the above embodiments, which is not described in detail herein again. The second consistency threshold may be obtained with reference to the first consistency threshold in the above embodiments, and the second preset condition may be obtained with reference to the first preset condition in the above embodiments.

The third consistency threshold is a judgment threshold for judging whether brightness trends of a single sub-area at different grayscales are consistent. If the third difference value is greater than or equal to the third consistency threshold, it indicates that the brightness trends of the sub-area are inconsistent. However, to determine whether an overall brightness trend of the display area of the display panel at a target grayscale is consistent, there is a need to further refer to a number of sub-areas with inconsistent brightness trends in different display colors. The third preset condition includes a determination condition indicating that the overall brightness trend of the display area of the display panel in different display colors is inconsistent, which is related to the number of sub-areas with inconsistent brightness trends. For example, the third preset condition includes the number of sub-areas with the third difference value greater than or equal to the third consistency threshold being greater than or equal to a third number threshold. The third number threshold may be set according to a scenario, a requirement, experience, or the like, which is not limited herein. For example, the third number threshold is 1 or another positive integer. In another example, the third preset condition includes a proportion of the number of sub-areas with the third difference value greater than or equal to the third consistency threshold to a total number of sub-areas being greater than or equal to a third proportion threshold. The third proportion threshold may be set according to a scenario, a requirement, experience, or the like, which is not limited herein. For example, the third proportion threshold may be ⅓, ⅖, or the like. If the number of sub-areas with the third difference value greater than or equal to the third consistency threshold satisfies the third preset condition, it indicates that the overall brightness trend of the display area of the display panel in different display colors at the target grayscale is inconsistent.

When one of the second preset condition and the third preset condition is satisfied, it may be determined that the brightness trend of the target grayscale is inconsistent.

In step S1015*b*, the target grayscale is determined to be a target grayscale with a consistent brightness trend in a case where the number of sub-areas with the second difference value exceeding the second consistency threshold does not satisfy the second preset condition or the number of sub-areas with the third difference value exceeding the third consistency threshold does not satisfy the third preset condition.

It may be determined that the brightness trend of the target grayscale is consistent only when neither the second preset condition nor the third preset condition is satisfied. Specific content of the second preset condition and the third preset condition may be obtained with reference to the related description in the above embodiments, which is not described in detail herein again.

In the above embodiments, for the maximum grayscale of the display panel, whether the brightness grayscale of the maximum grayscale is consistent may be determined according to the third difference value, the third consistency threshold, and the third preset condition. Specific content of the third difference value, the third consistency threshold, and the third preset condition may be obtained with reference to the related description in the above embodiments, which is not described in detail herein again.

The display area of the display panel is divided into a plurality of sub-areas, and whether an overall brightness trend of the display panel is consistent is judged through brightness trends of the sub-areas at different target grayscales and brightness trends in different display colors at a same target grayscale, which can improve accuracy of determination of whether the overall brightness trend of the display panel is consistent, to improve accuracy of a brightness trend consistency interval subsequently obtained and improve compensation accuracy, thereby further improving the uniformity of display of the display panel.

Figure 5:
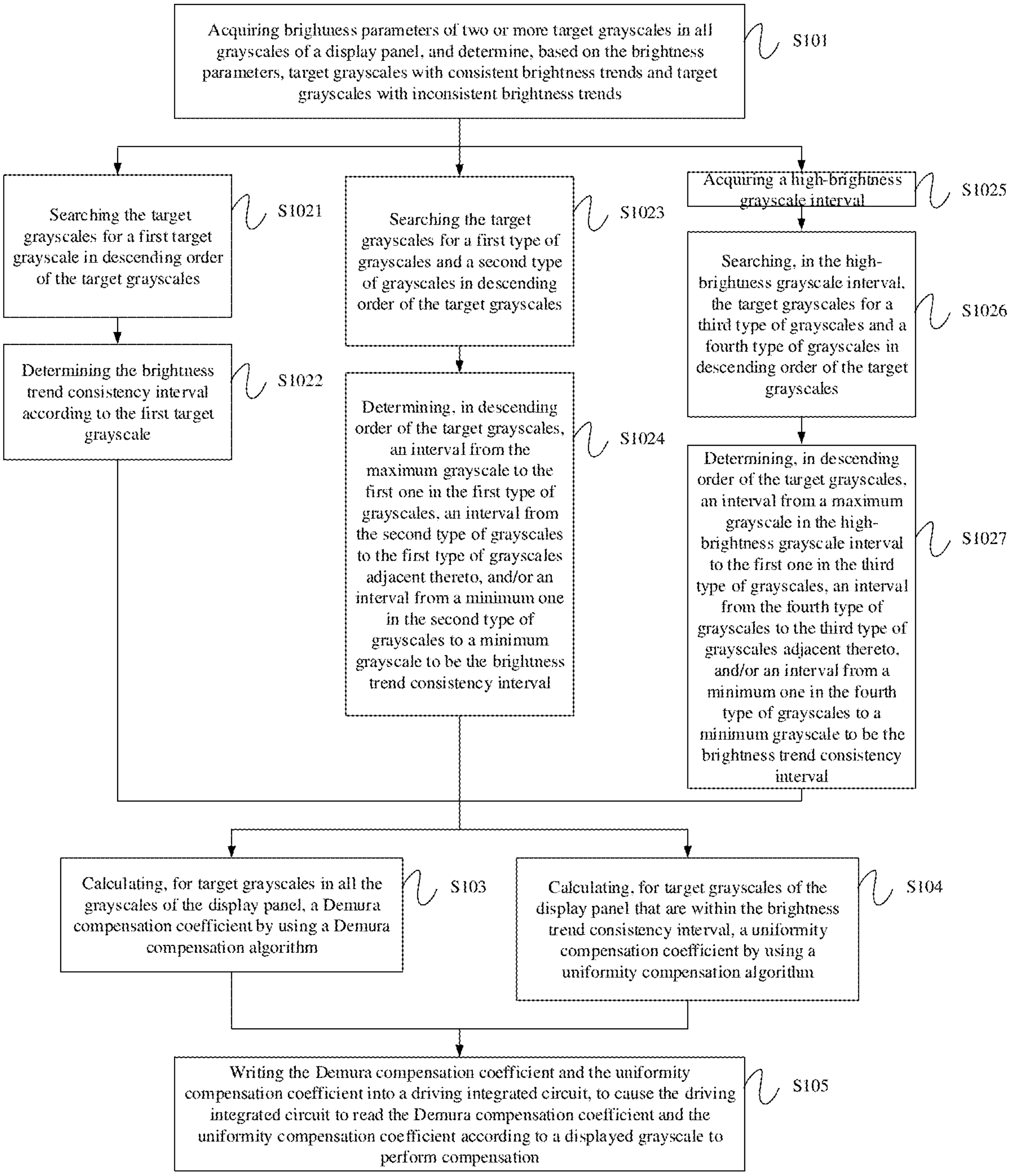
FIG. 5 is a flowchart of a display compensation method according to still another embodiment of the present application.

In some embodiments, the target grayscales include a maximum grayscale, and the maximum grayscale is 255. The brightness trend consistency interval may be determined through target grayscales jumping from a consistent brightness trend to an inconsistent brightness trend. FIG. 5 shows a display compensation method according to still another embodiment of the present application. FIG. 5 is different from FIG. 1 in that step S102 in FIG. 1 may be specifically refined into step S1021 and step S1022 in FIG. 5, or step S102 in FIG. 1 may be specifically refined into step S1023 and step S1024 in FIG. 5, or step S102 in FIG. 1 may be specifically refined into step S1025 to step S1027 in FIG. 5.

In step S1021, the target grayscales are searched for a first target grayscale in descending order of the target grayscales.

The first target grayscale is a first target grayscale with an inconsistent brightness trend. Whether brightness trends of the target grayscales are consistent may be sequentially determined in descending order of the target grayscales. In this process, a first target grayscale with an inconsistent brightness trend is determined to be the first target grayscale.

In step S1022, the brightness trend consistency interval is determined according to the first target grayscale.

An upper limit value of the brightness trend consistency interval is the maximum grayscale, and a lower limit value of the brightness trend consistency interval is the first target grayscale. In all the grayscales, the areas outside the brightness trend consistency interval are within a non-brightness trend consistency interval. The non-brightness trend consistency interval may be regarded as a grayscale interval with inconsistent brightness trends. For example, if the first target grayscale is Dn, the brightness trend consistency interval is (Dn, 255], and the non-brightness trend consistency interval is (0, Dn].

It is to be noted that, if the brightness trend of the maximum grayscale is inconsistent, 255 may be taken as the brightness trend consistency interval, and (0, 254]) is the non-brightness trend consistency interval.

For ease of description, a manner of determining the brightness trend consistency interval through step S1021 and step S1022 is described below with a table, as shown in Table 1 below:

TABLE 1

| Target grayscale 255 | Target grayscale 224 | Target grayscale 128 | Brightness trend consistency interval |
|---|---|---|---|
| 1 | 1 | 1 | (pending value, 255] |
| 1 | 1 | 0 | (128, 255] |
| 1 | 0 | 1 | (224, 255] |
| 1 | 0 | 0 | (224, 255] |
| 0 | 1 | 1 | 255 |
| 0 | 1 | 0 | 255 |
| 0 | 0 | 1 | 255 |
| 0 | 0 | 0 | 255 |

wherein 1 denotes a consistent brightness trend, and 0 denotes an inconsistent brightness trend. When the target grayscale 255, the target grayscale 224, and the target grayscale 128 have consistent brightness trends, since a target grayscale with an inconsistent brightness trend has not yet appeared, more target grayscales may be obtained until the target grayscale with the inconsistent brightness trend appears. The pending value is the first target grayscale with an inconsistent brightness trend subsequently appearing. When the target grayscale 255 and the target grayscale 224 have consistent brightness trends and the target grayscale 128 has an inconsistent brightness trend, in descending order of the target grayscales, the target grayscale 128 is the first target grayscale with an inconsistent brightness trend. Therefore, the brightness trend consistency interval is (128, 255], and the non-brightness trend consistency interval is (0, 128]. When the target grayscale 255 has a consistent brightness trend and the target grayscale 224 and the target grayscale 128 have inconsistent brightness trends, in descending order of the target grayscales, the target grayscale 224 is the first target grayscale with an inconsistent brightness trend. Therefore, the brightness trend consistency interval is (224, 255], and the non-brightness trend consistency interval is (0, 224]. When the target grayscale 255 and the target grayscale 128 have consistent brightness trends but the target grayscale 224 has an inconsistent brightness trend, in descending order of the target grayscales, the target grayscale 224 is the first target grayscale with an inconsistent brightness trend. Therefore, the brightness trend consistency interval is (224, 255], and the non-brightness trend consistency interval is (0, 224]. When the target grayscale 255 has an inconsistent brightness trend, that is, the target grayscale 255 is the first target grayscale, attention may no longer be paid to brightness trends of other grayscales.

In some examples, a fixed number of target grayscales may be selected in advance. If the fixed number of target grayscales include the first target grayscale, whether brightness trends of other target grayscales smaller than the first target grayscale are consistent may no longer be determined after the first target grayscale is acquired.

In some examples, a fixed number of target grayscales may be selected in advance. If the fixed number of target grayscales do not include the first target grayscale, smaller target grayscales may be continuously acquired, and whether a brightness trend of the acquired new target grayscale is consistent is determined until the first target grayscale appears.

In some examples, a plurality of candidate grayscales may be selected relatively evenly from all the grayscales 0 to 255 in advance, the candidate grayscales are sequentially taken as target grayscales, in descending order of the target grayscales, whether brightness trends of the candidate grayscales are consistent is determined until the first target grayscale is obtained, and whether brightness trends of other candidate grayscales smaller than the first target grayscale are consistent may not be determined.

In step S1021 and step S1022, main focus is on the first target grayscale with an inconsistent brightness trend in descending order of the target grayscales, that is, the first target grayscale, and no attention is paid to whether there is a grayscale with a consistent brightness trend after the first target grayscale, which can save computing resources, reduce the time spent in determining the brightness trend consistency interval, improve efficiency of display compensation, and achieve a better balance between display compensation efficiency and a display compensation effect.

In step S1023, the target grayscales are searched for a first type of grayscales and a second type of grayscales in descending order of the target grayscales.

The first type of grayscales include target grayscales with brightness trends that are inconsistent and different from a brightness trend of a previous target grayscale. That is, the brightness trends of the first type of grayscales are inconsistent, and in descending order of the target grayscales, the brightness trend of the previous target grayscale of the first type of grayscales is consistent. The first type of grayscales may be regarded as a turning point of grayscales from a consistent brightness trend to an inconsistent brightness trend.

The second type of grayscales include target grayscales with brightness trends that are consistent and different from a brightness trend of a previous target grayscale. That is, the brightness trends of the second type of grayscales are consistent, and in descending order of the target grayscales, the brightness trend of the previous target grayscale of the second type of grayscales is inconsistent. The second type of grayscales may be regarded as a turning point of grayscales from an inconsistent brightness trend to a consistent brightness trend.

In step S1024, in descending order of the target grayscales, an interval from the maximum grayscale to the first one in the first type of grayscales, an interval from the second type of grayscales to the first type of grayscales adjacent thereto, and/or an interval from a minimum one in the second type of grayscales to a minimum grayscale are determined to be the brightness trend consistency interval.

The interval from the maximum grayscale to the first one in the first type of grayscales does not include the first one in the first type of grayscales. The interval from the second type of grayscales to the first type of grayscales adjacent thereto does not include the first type of grayscales adjacent thereto.

In some examples, if the brightness trend of the maximum grayscale is consistent, the brightness trend consistency interval includes the interval from the maximum grayscale to the first one in the first type of grayscales.

In all the grayscales, other intervals except the brightness trend consistency interval are non-brightness trend consistency intervals.

For ease of description, a manner of determining the brightness trend consistency interval through step S1023 and step S1024 is described below with a table, as shown in Table 2 below:

TABLE 2

| Target grayscale 255 | Target grayscale 224 | Target grayscale 128 | Target grayscale 64 | Target grayscale 32 | Target grayscale 16 | Brightness trend consistency interval |
|---|---|---|---|---|---|---|
| 1 | 1 | 1 | 0 | 0 | 1 | (64, 255] and (0, 16] |
| 1 | 0 | 0 | 1 | 0 | 0 | (224, 255] and (32, 64] |
| 1 | 0 | 1 | 0 | 1 | 1 | (224, 255], (64, 128], and (0, 32] |
| 0 | 1 | 1 | 1 | 0 | 0 | (32, 224] |
| 0 | 1 | 0 | 1 | 1 | 0 | (128, 224] and (16, 64] |
| 0 | 0 | 1 | 0 | 1 | 1 | (64, 128] and (0, 32] |

wherein 1 denotes a consistent brightness trend, 0 denotes an inconsistent brightness trend, and each row represents a case. In the first case, the first type of grayscales include the target grayscale 64, the second type of grayscales include the target grayscale 16, and correspondingly, the brightness trend consistency interval includes (64, 255] and (0, 16] and the non-brightness trend consistency interval includes (16, 64]. In the second case, the first type of grayscales include the target grayscale 224 and the target grayscale 32, the second type of grayscales include the target grayscale 64, and correspondingly, the brightness trend consistency interval includes (224, 255] and (32, 64] and the non-brightness trend consistency interval includes (64, 224] and (0, 32]. In the third case, the first type of grayscales include the target grayscale 224 and the target grayscale 64, the second type of grayscales include the target grayscale 128 and the target grayscale 32, and correspondingly, the brightness trend consistency interval includes (224, 255], (64, 128], and (0, 32] and the non-brightness trend consistency interval includes (128, 224] and (32, 64]. In the fourth case, the first type of grayscales include the target grayscale 32, the second type of grayscales include the target grayscale 224, and correspondingly, the brightness trend consistency interval includes (32, 224] and the non-brightness trend consistency interval includes (224, 255] and (0, 32]. In the fifth case, the first type of grayscales include the target grayscale 128 and the target grayscale 16, the second type of grayscales include the target grayscale 224 and the target grayscale 64, and correspondingly, the brightness trend consistency interval includes (128, 224] and (16, 64] and the non-brightness trend consistency interval includes (224, 255], (64, 128], and (0, 16]. In the sixth case, the first type of grayscales include the target grayscale 64, the second type of grayscales include the target grayscale 128 and the target grayscale 32, and correspondingly, the brightness trend consistency interval includes (64, 128] and (0, 32] and the non-brightness trend consistency interval includes (128, 255] and (32, 64].

In step S1023 and step S1024, attention is paid to each interval with a consistent brightness trend and each interval with an inconsistent brightness trend in all the grayscales, so that the determined brightness trend consistency interval is more accurate, which further improves the compensation effect of the display panel, thereby further improving the uniformity of display of the display panel.

In step S1025, a high-brightness grayscale interval is acquired.

The high-brightness grayscale interval is a preset grayscale area that represents high brightness. Specifically, a high-brightness grayscale threshold may be set. The high-brightness grayscale interval is a grayscale area whose grayscale is greater than or equal to the high-brightness grayscale threshold. In all the grayscales, grayscale areas expect the high-brightness grayscale interval are low-brightness grayscale areas. Specifically, the low-brightness grayscale areas may include grayscale areas whose grayscales are less than the high-brightness grayscale threshold.

In step S1026, in the high-brightness grayscale interval, the target grayscales are searched for a third type of grayscales and a fourth type of grayscales in descending order of the target grayscales.

The third type of grayscales include target grayscales with inconsistent brightness trends and different from a previous target grayscale in brightness trend consistency. That is, the third type of grayscales are within the high-brightness grayscale interval, the brightness trends of the third type of grayscales are inconsistent, and in descending order of the target grayscales, the brightness trend of the previous target grayscale of the third type of grayscales is consistent. The third type of grayscales may be regarded as a turning point of grayscales from a consistent brightness trend to an inconsistent brightness trend in the high-brightness grayscale interval.

The fourth type of grayscales include target grayscales with consistent brightness trends and different from a previous target grayscale in brightness trend consistency. That is, the fourth type of grayscales are within the high-brightness grayscale interval, the brightness trends of the fourth type of grayscales are consistent, and in descending order of the target grayscales, the brightness trend of the previous target grayscale of the fourth type of grayscales is inconsistent. The fourth type of grayscales may be regarded as a turning point of grayscales from an inconsistent brightness trend to a consistent brightness trend in the high-brightness grayscale interval.

In step S1027, in descending order of the target grayscales, an interval from a maximum grayscale in the high-brightness grayscale interval to the first one in the third type of grayscales, an interval from the fourth type of grayscales to the third type of grayscales adjacent thereto, and/or an interval from a minimum one in the fourth type of grayscales to a minimum grayscale are determined to be the brightness trend consistency interval.

The interval from the maximum grayscale to the first one in the third type of grayscales does not include the first one in the third type of grayscales. The interval from the fourth type of grayscales to the third type of grayscales adjacent thereto does not include the third type of grayscales adjacent thereto.

In some examples, if the brightness trend of the maximum grayscale is consistent, the brightness trend consistency interval includes the interval from the maximum grayscale to the first one in the third type of grayscales.

In some examples, when a target grayscale in the high-brightness grayscale interval and closest to a lower limit value of the high-brightness grayscale interval, that is, the high-brightness grayscale threshold, belongs to the fourth type of grayscales, the brightness trend consistency interval includes the interval from the minimum one in the fourth type of grayscales to the minimum grayscale.

The minimum grayscale herein may include a minimum grayscale value in all the grayscales or a minimum grayscale value in the high-brightness grayscale interval. For example, all the grayscales are [0, 255], the high-brightness grayscale interval is [64, 255], a minimum grayscale value in all the grayscales is 0, and a minimum grayscale value in the high-brightness grayscale interval is 64.

In all the grayscales, other intervals except the brightness trend consistency interval are non-brightness trend consistency intervals.

For ease of description, a manner of determining the brightness trend consistency interval through step S1025 to step S1027 is described below with a table. The high-brightness grayscale interval is [64, 255], and the minimum grayscale includes the minimum grayscale value in all the grayscales, as shown in Table 3 below:

TABLE 3

| Target grayscale 255 | Target grayscale 224 | Target grayscale 128 | Target grayscale 64 | Target grayscale 32 | Target grayscale 16 | Brightness trend consistency interval |
|---|---|---|---|---|---|---|
| 1 | 1 | 1 | 0 | 0 | 1 | (64, 255] |
| 1 | 0 | 0 | 1 | 0 | 0 | (224, 255] |
| 1 | 0 | 1 | 0 | 1 | 1 | (224, 255] and (64, 128] |
| 0 | 1 | 1 | 1 | 0 | 0 | (0, 224] |
| 0 | 1 | 0 | 1 | 1 | 0 | (128, 224] |
| 0 | 0 | 1 | 0 | 1 | 1 | (64, 128] |

wherein 1 denotes a consistent brightness trend, 0 denotes an inconsistent brightness trend, and each row represents a case. In the first case, the third type of grayscales include the target grayscale 64, the fourth type of grayscales do not exist, and correspondingly, the brightness trend consistency interval includes (64, 255] and the non-brightness trend consistency interval includes (0, 64]. In the second case, the third type of grayscales include the target grayscale 224, the fourth type of grayscales include the target grayscale 64, and correspondingly, the brightness trend consistency interval includes (224, 255] and the non-brightness trend consistency interval includes (0, 224]. In the third case, the third type of grayscales include the target grayscale 224 and the target grayscale 64, the fourth type of grayscales include the target grayscale 128, and correspondingly, the brightness trend consistency interval includes (224, 255] and (64, 128] and the non-brightness trend consistency interval includes (128, 224] and (0, 64]. In the fourth case, the third type of grayscales do not exist, the fourth type of grayscales include the target grayscale 224, and correspondingly, the brightness trend consistency interval includes (0, 224] and the non-brightness trend consistency interval includes (224, 255]. In the fifth case, the third type of grayscales include the target grayscale 128, the fourth type of grayscales include the target grayscale 224 and the target grayscale 64, and correspondingly, the brightness trend consistency interval includes (128, 224] and the non-brightness trend consistency interval includes (224, 255] and (0, 128]. In the sixth case, the third type of grayscales include the target grayscale 64, the fourth type of grayscales include the target grayscale 128, and correspondingly, the brightness trend consistency interval includes (64, 128] and the non-brightness trend consistency interval includes (128, 255] and (0, 64].

For ease of understanding, the fourth case shown in Table 3 is taken as an example herein to describe that the minimum grayscale includes a brightness trend consistency interval and a non-brightness trend consistency interval under the condition of the minimum grayscale value in the high-brightness grayscale interval. In the fourth case, the third type of grayscales do not exist, the fourth type of grayscales include the target grayscale 224, and correspondingly, the non-brightness trend consistency interval includes (224, 255], and the brightness trend consistency interval includes (64, 224]. (0, 64] may be determined to be the non-brightness trend consistency interval or the brightness trend consistency interval.

The uniformity problem is more obvious under a high brightness condition, that is, when the grayscale is within the high-brightness grayscale interval, which has a greater impact on the display effect. It is difficult for a user to detect, with naked eyes, the uniformity problem under a low brightness condition, that is, when the grayscale is not in the high-brightness grayscale interval, which has a small impact on the display effect and may be ignored. In step S1025 to step S1027, whether brightness trends of grayscales in the non-high-brightness grayscale interval are consistent is omitted, and main focus is on whether brightness trends of target grayscales in the high-brightness grayscale interval are consistent, which can reduce consumption of computing resources and further improve the efficiency of display compensation on the basis of improvement of a uniformity effect.

Figure 6:
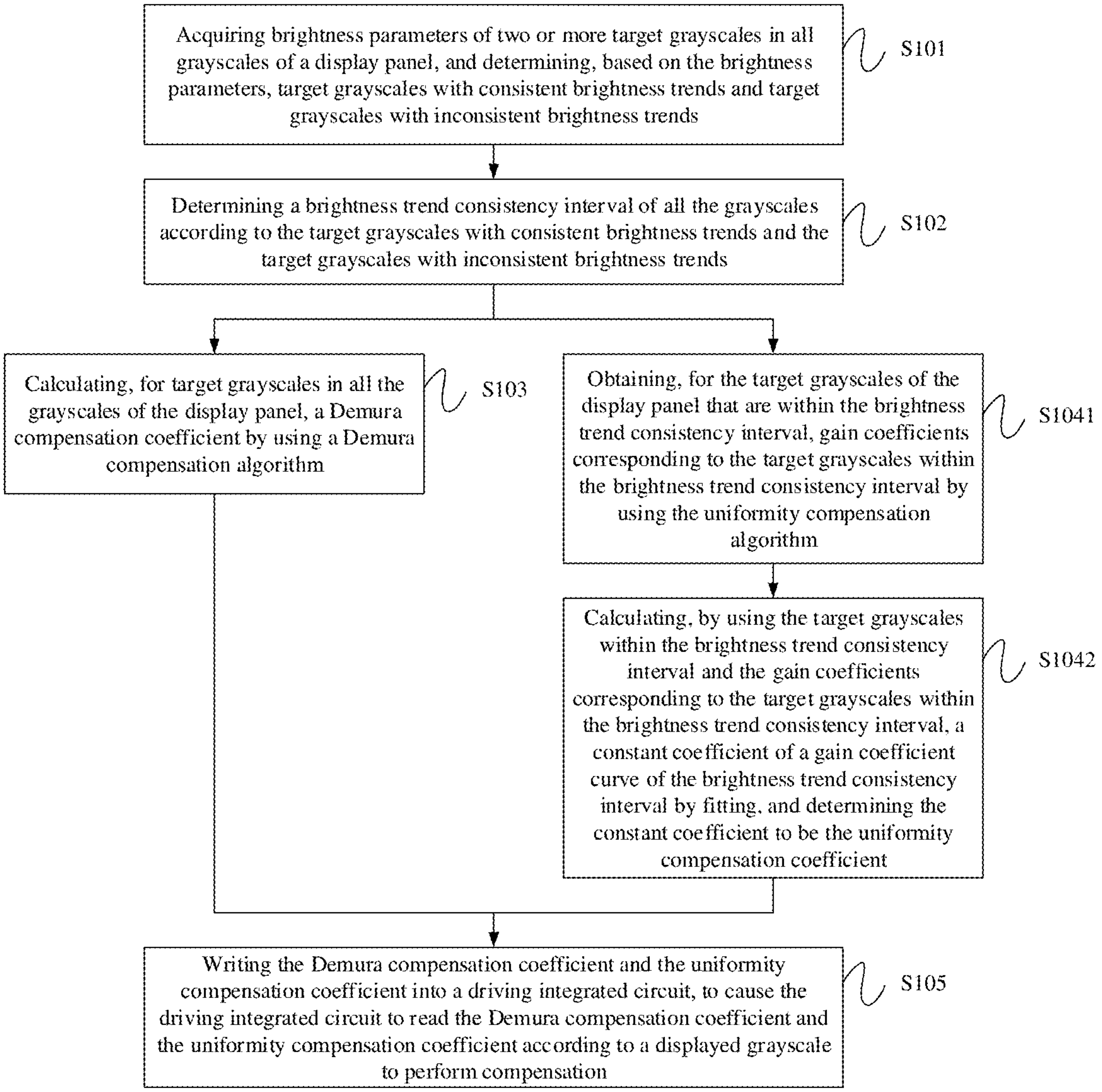
FIG. 6 is a flowchart of a display compensation method according to a further embodiment of the present application.

In some embodiments, the uniformity compensation coefficient may be obtained by data fitting. FIG. 6 shows a display compensation method according to a further embodiment of the present application. FIG. 6 is different from FIG. 1 in that step S104 in FIG. 1 may be specifically refined into step S1041 to step S1042 in FIG. 6.

In step S1041, for the target grayscales of the display panel that are within the brightness trend consistency interval, gain coefficients corresponding to the target grayscales within the brightness trend consistency interval are obtained by using the uniformity compensation algorithm.

Brightness parameters of the target grayscales displayed on the display panel that are within the brightness trend consistency interval may be collected, and gain coefficients corresponding to the target grayscales within the brightness trend consistency interval are calculated by using the uniformity compensation algorithm according to the brightness parameters and expected brightness parameters. The gain coefficients may be used to compensate for a part in an original display signal corresponding to target grayscales within the brightness trend consistency interval, so that, when the display panel displays the target grayscales within the brightness trend consistency interval, the collected brightness parameters may be the same as or tend to be the same as the expected brightness parameters.

In step S1042, by using the target grayscales within the brightness trend consistency interval and the gain coefficients corresponding to the target grayscales within the brightness trend consistency interval, a constant coefficient of a gain coefficient curve of the brightness trend consistency interval is calculated by fitting, and the constant coefficient is determined to be the uniformity compensation coefficient.

Each target grayscale within the brightness trend consistency interval corresponds to a gain coefficient. Each target grayscale within the brightness trend consistency interval and the gain coefficient corresponding to the target grayscale may be converted into a coordinate point (target grayscale, gain coefficient), to establish a uniformity compensation gain formula with an unknown constant coefficient. The uniformity compensation gain formula is used to represent the gain coefficient curve of the brightness trend consistency interval. The gain coefficient curve is a relation curve of gain coefficients and grayscales. The constant coefficient of the uniformity compensation gain formula is solved by using coordinate points corresponding to the target grayscales within the brightness trend consistency interval, to obtain the constant coefficient. The uniformity compensation gain formula with an unknown constant coefficient can accurately represent the gain coefficient curve in the brightness trend consistency interval. The constant coefficient is the uniformity compensation coefficient required for uniformity compensation. A fitting calculation algorithm may include a fitting algorithm such as a least squares method, which is not limited herein.

For example, the uniformity compensation gain formula may be established. The uniformity compensation gain formula is shown in the following formula (2):

$$y = a + bx \tag{2}$$

where a and b denote constant coefficients, which are currently unknown; x denotes a grayscale, and y denotes a gain coefficient.

Specific values of the constant coefficients a and b may be calculated by the least squares method. A specific calculation process may be shown in the following formulas (3) to (6):

$$I(a, b) = \sum_{i=0}^{n} (y_i - a - bx_i)^2 \tag{3}$$

$$\begin{cases} \dfrac{\partial I(a, b)}{\partial a} = -2\sum_{i=0}^{n} (y_i - a - bx_i) = 0 \\ \dfrac{\partial I(a, b)}{\partial b} = -2\sum_{i=0}^{n} (y_i - a - bx_i) = 0 \end{cases} \tag{4}$$

$$\begin{cases} a\sum_{i=0}^{n} 1 + b\sum_{i=0}^{n} x_i = \sum_{i=0}^{n} y_i \\ a\sum_{i=0}^{n} x_i + b\sum_{i=0}^{n} x_i^2 = \sum_{i=0}^{n} x_i y_i \end{cases} \tag{5}$$

$$\begin{cases} a = \dfrac{\sum_{i=0}^{n} y_i \times \sum_{i=0}^{n} x_i^2 - \sum_{i=0}^{n} x_i y_i \times \sum_{i=0}^{n} x_i}{\sum_{i=0}^{n} 1 \times \sum_{i=0}^{n} x_i^2 - \left(\sum_{i=0}^{n} x_i\right)^2} \\ b = -\dfrac{\sum_{i=0}^{n} y_i \times \sum_{i=0}^{n} x_i - \sum_{i=0}^{n} x_i y_i \times \sum_{i=0}^{n} 1_i}{\sum_{i=0}^{n} 1 \times \sum_{i=0}^{n} x_i^2 - \left(\sum_{i=0}^{n} x_i\right)^2} \end{cases} \tag{6}$$

where $x_i$ denotes an $i^{th}$ target grayscale in the brightness trend consistency interval, and the brightness trend consistency interval includes n+1 target grayscales, where n is an integer; and $y_i$ denotes a gain coefficient corresponding to the $i^{th}$ target grayscale in the brightness trend consistency interval. For example, if the brightness trend consistency interval includes 3 target grayscales and the target grayscales are 255, 224, and 128 respectively, the gain coefficient corresponding to the target grayscale 255 is G1, the gain coefficient corresponding to the target grayscale 224 is G2, and the gain coefficient corresponding to the target grayscale 128 is G3. Three coordinate points (255, G1), (224, G2), and (128, G3) may be used as (x1, y1), (X2, y2) and (x3, y3) and substituted into the above formulas (3) to (6) to calculate the constant coefficients a and b.

Through the above formulas (3) to (6), the constant coefficients a and b may be calculated. The constant coefficients a and b are uniformity compensation coefficients. The uniformity compensation gain formula of the gain coefficient curve used to represent the brightness trend consistency interval may be obtained by substituting the constant coefficients a and b into the formula (2). The uniformity compensation gain formula may be written into the display panel. After the uniformity compensation coefficients are written into the display panel, the display panel may read the uniformity compensation coefficients, run the uniformity compensation gain formula, calculate the gain coefficient, and use the gain coefficient to compensate for the display signal in the brightness trend consistency interval.

In some examples, the display area of the display panel includes a plurality of sub-areas. Correspondingly, the gain coefficients corresponding to the target grayscales within the brightness trend consistency interval include gain coefficients corresponding to the target grayscales within the brightness trend consistency interval in the sub-areas, and the constant coefficient of the gain coefficient curve of the brightness trend consistency interval includes constant coefficients corresponding to the sub-areas. The constant coefficient corresponding to each sub-area may be calculated through step S1041 and step S1042. For example, the constant coefficient corresponding to each sub-area may be calculated according to the above formulas (2) to (6). Gain coefficients of different sub-areas may be different, and constant coefficients corresponding to different sub-areas may also be different. The constant coefficients corresponding to the sub-areas may be written into the display panel, and the display panel may read the constant coefficients corresponding to the sub-areas, and perform uniformity compensation for the sub-areas respectively according to the division into the sub-areas. The uniformity compensation for the sub-areas respectively may further increase the accuracy of uniformity compensation, thereby further improving the uniformity of display of the display panel.

Figure 7:
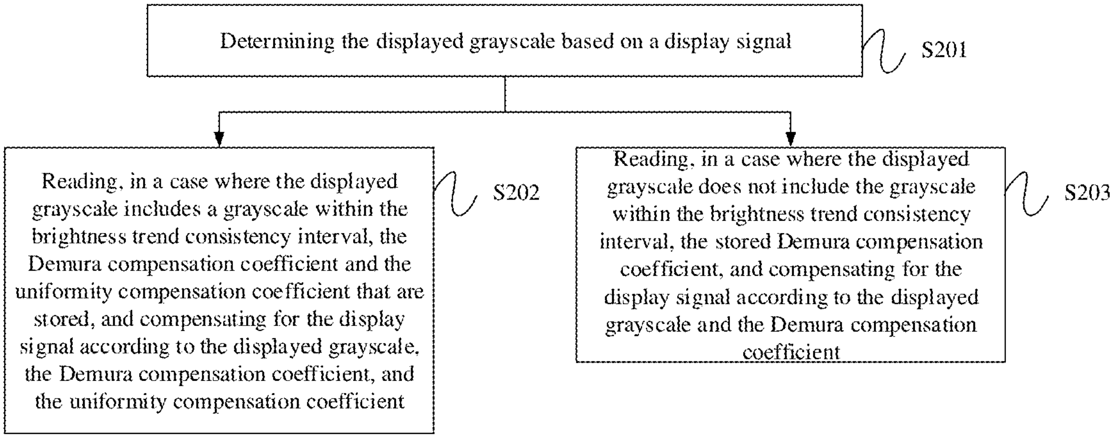
FIG. 7 is a flowchart of a display compensation method according to an embodiment of the present application.

In a second aspect of the present application, there is provided a display compensation method applied to a driving IC in a display apparatus. That is, the display compensation method may be performed by the driving IC. The driving IC stores the Demura compensation coefficient and the uniformity compensation coefficient obtained and written into the driving IC according to the embodiments in the first aspect. FIG. 7 is a flowchart of a display compensation method according to an embodiment of the present application. As shown in FIG. 7, the display compensation method may include step S201 to step S203.

In step S201, the displayed grayscale is determined based on a display signal.

The display signal is a signal used to represent a displayed image. The display panel displays an image based on the display signal. A grayscale corresponding to the displayed image may be determined through the display signal.

In step S202, in a case where the displayed grayscale includes a grayscale within the brightness trend consistency interval, the Demura compensation coefficient and the uniformity compensation coefficient that are stored are read, and the display signal is compensated for according to the displayed grayscale, the Demura compensation coefficient, and the uniformity compensation coefficient.

The displayed grayscale includes a grayscale within the brightness trend consistency interval, and there is a need to compensate for a part in the display signal corresponding to the grayscale within the brightness trend consistency interval by using the uniformity compensation coefficient and the Demura compensation coefficient. Then, image display is performed by using the display signal after compensation.

In some examples, the uniformity compensation coefficient includes the constant coefficient of the gain coefficient curve of the brightness trend consistency interval, the grayscale within the brightness trend consistency interval in the displayed grayscale may be substituted into the gain coefficient curve to obtain a gain coefficient corresponding to the grayscale, and uniformity compensation is performed on the display signal by using the gain coefficient.

In step S203, in a case where the displayed grayscale does not include the grayscale within the brightness trend consistency interval, the stored Demura compensation coefficient is read, and the display signal is compensated for according to the displayed grayscale and the Demura compensation coefficient.

The displayed grayscale does not include the grayscale within the brightness trend consistency interval, which indicates that a compensation effect of uniformity compensation and a compensation effect of Demura compensation of the displayed grayscale may cancel each other out, and the display signal may be compensated for only by using the Demura compensation coefficient. Then, image display is performed by using the display signal after compensation.

The display signal is compensated for by using the Demura compensation coefficient, which can increase or decrease a voltage or a current of the display signal to adjust the display signal, thereby changing brightness of sub-pixels driven by the display signal. Similarly, the display signal is compensated for by using the uniformity compensation coefficient, which can increase or decrease a voltage or a current of the display signal to adjust the display signal, thereby changing brightness of sub-pixels driven by the display signal. In this embodiment of the present application, the compensation for the display signal by the Demura compensation coefficient and the compensation for the display signal by the uniformity compensation coefficient may be superimposed and act on the brightness trend consistency interval. The non-brightness trend consistency interval may be affected by the compensation effect of the Demura compensation coefficient on the display signal, and may not be affected by the compensation effect of the uniformity compensation coefficient on the display signal.

Specific content of the uniformity compensation coefficient and the Demura compensation coefficient may be obtained with reference to the related description in the above embodiments, which is not described in detail herein again.

In this embodiment of the present application, the display panel stores the uniformity compensation coefficient and the Demura compensation coefficient, and in a case where the displayed grayscale determined based on the display signal includes a grayscale within the brightness trend consistency interval, a part in the display signal corresponding to the grayscale within the brightness trend consistency interval is compensated for by using the uniformity compensation coefficient and the Demura compensation coefficient, and a part in the display signal not corresponding to the grayscale within the brightness trend consistency interval is compensated for by using the Demura compensation coefficient. In a case where the displayed grayscale determined based on the display signal does not include the grayscale within the brightness trend consistency interval, the displayed grayscale is compensated for by using the Demura compensation coefficient. Only the part in the display signal corresponding to the grayscale within the brightness trend consistency interval is compensated for by using the uniformity compensation coefficient, which can prevent mutual cancellation of the compensation effect of uniformity compensation and the compensation effect of Demura compensation, thereby improving the uniformity of display of the display panel.

Figure 8:
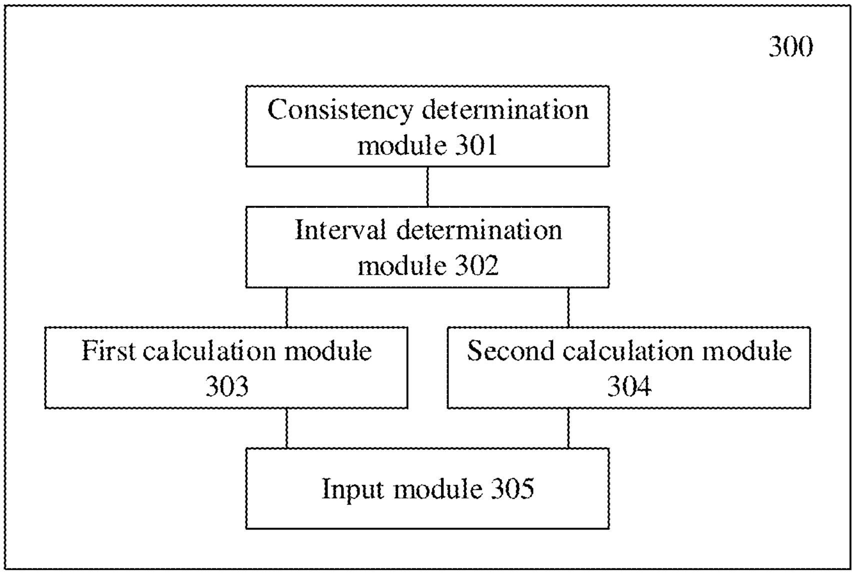
FIG. 8 is a schematic structural diagram of a display compensation apparatus according to an embodiment of the present application.

In a third aspect of the present application, a display compensation apparatus is provided. The display compensation apparatus may be an apparatus such as an upper computer, which is not limited herein. FIG. 8 shows a display compensation apparatus according to an embodiment of the present application. As shown in FIG. 8, a display compensation apparatus 300 may include a consistency determination module 301, an interval determination module 302, a first calculation module 303, a second calculation module 304, and an input module 305.

The consistency determination module 301 may be configured to acquire brightness parameters of two or more target grayscales in all grayscales of a display panel, and determine, based on the brightness parameters, target grayscales with consistent brightness trends and target grayscales with inconsistent brightness trends.

In some examples, the target grayscales include a maximum grayscale.

In some examples, the target grayscales include a maximum grayscale among grayscales specified for photographing during Demura compensation.

The interval determination module 302 may be configured to determine a brightness trend consistency interval of all the grayscales according to the target grayscales with consistent brightness trends and the target grayscales with inconsistent brightness trends.

The first calculation module 303 may be configured to calculate, for target grayscales in all the grayscales of the display panel, a Demura compensation coefficient by using a Demura compensation algorithm.

The second calculation module 304 may be configured to calculate, for target grayscales of the display panel that are within the brightness trend consistency interval, a uniformity compensation coefficient by using a uniformity compensation algorithm.

The input module 305 may be configured to write the Demura compensation coefficient and the uniformity compensation coefficient into a driving integrated circuit, to cause the driving integrated circuit to read the Demura compensation coefficient and the uniformity compensation coefficient according to a displayed grayscale to perform compensation.

In this embodiment of the present application, brightness parameters of a plurality of target grayscales of a display panel may be acquired, and target grayscales with consistent brightness trends and target grayscales with inconsistent brightness trends are determined based on the brightness parameters. A brightness trend consistency interval of grayscales is determined according to the target grayscales with consistent brightness trends and the target grayscales with inconsistent brightness trends. For target grayscales in all the grayscales of the display panel, a Demura compensation coefficient is calculated by using a Demura compensation algorithm. For target grayscales of the display panel that are within the brightness trend consistency interval, a uniformity compensation coefficient is calculated by using a uniformity compensation algorithm. The Demura compensation coefficient and the uniformity compensation coefficient are written into the driving IC. The Demura compensation coefficient acts on all the grayscales displayed on the display panel, that is, Demura compensation may compensate for all the grayscales displayed on the display panel; the uniformity compensation coefficient only acts on the grayscales displayed on the display panel that are within the brightness trend consistency interval, that is, uniformity compensation may only compensate for the grayscales displayed on the display panel that are within the brightness trend consistency interval, thereby preventing mutual cancellation of compensation effects of Demura compensation and uniformity compensation and improving uniformity of the display panel.

In some embodiments, the target grayscales include a maximum grayscale. The consistency determination module 301 may be configured to divide a display area of the display panel into $N_1$ sub-areas, $N_1$ being an integer greater than or equal to 2; determine, based on brightness parameters of the $N_1$ sub-areas, brightness representation values of different target grayscales of each sub-area in the $N_1$ sub-areas; acquire a first difference value between a brightness representation value of a target grayscale and a brightness representation value of the maximum grayscale in each sub-area; determine the target grayscale to be a target grayscale with an inconsistent brightness trend in a case where a number of sub-areas with the first difference value greater than or equal to a first consistency threshold satisfies a first preset condition; and determine the target grayscale to be a target grayscale with an consistent brightness trend in a case where the number of sub-areas with the first difference value greater than or equal to the first consistency threshold does not satisfy the first preset condition.

In some embodiments, the target grayscales include a maximum grayscale. The consistency determination module 301 may be configured to divide a display area of the display panel into $N_2$ sub-areas, $N_2$ being an integer greater than or equal to 2; determine, based on brightness parameters of the $N_2$ sub-areas, brightness representation values of different target grayscales of each sub-area in the $N_2$ sub-areas, and a brightness representation value of a first display color and a brightness representation value of a second display color of each sub-area at a same target grayscale, the first display color being white, and the second display color being at least one of red, green, and blue; acquire a second difference value between a brightness representation value of a target grayscale and a brightness representation value of the maximum grayscale in each sub-area, and a third difference value between the brightness representation value of the first display color and the brightness representation value of the second display color of each sub-area at the same target grayscale; determine the target grayscale to be a target grayscale with an inconsistent brightness trend in a case where a number of sub-areas with the second difference value exceeding a second consistency threshold satisfies a second preset condition or a number of sub-areas with the third difference value exceeding a third consistency threshold satisfies a third preset condition; and determine the target grayscale to be a target grayscale with a consistent brightness trend in a case where the number of sub-areas with the second difference value exceeding the second consistency threshold does not satisfy the second preset condition or the number of sub-areas with the third difference value exceeding the third consistency threshold does not satisfy the third preset condition.

In some examples, the brightness representation value is determined according to the brightness parameter of the sub-area and a reference brightness parameter corresponding to the target grayscale, and the reference brightness parameter includes a pre-specified brightness parameter or a brightness parameter of any of the sub-areas.

In some embodiments, the target grayscales include a maximum grayscale. The interval determination module 302 may be configured to search the target grayscales for a first target grayscale in descending order of the target grayscales, the first target grayscale being a first target grayscale with an inconsistent brightness trend; and determine the brightness trend consistency interval according to the first target grayscale, an upper limit value of the brightness trend consistency interval being the maximum grayscale, and a lower limit value of the brightness trend consistency interval being the first target grayscale.

In some embodiments, the target grayscales include a maximum grayscale. The interval determination module 302 may be configured to search the target grayscales for a first type of grayscales and a second type of grayscales in descending order of the target grayscales, wherein the first type of gray scales include target grayscales with brightness trends that are inconsistent and different from a brightness trend of a previous target grayscale, and the second type of grayscales include target grayscales with brightness trends that are consistent and different from a brightness trend of a previous target grayscale; and determine, in descending order, an interval from the maximum grayscale to the first one in the first type of grayscales, an interval from the second type of grayscales to the first type of grayscales adjacent thereto, and/or an interval from a minimum one in the second type of grayscales to a minimum grayscale to be the brightness trend consistency interval.

In some embodiments, the target grayscales include a maximum grayscale. The interval determination module 302 may be configured to acquire a high-brightness grayscale interval; search, in the high-brightness grayscale interval, the target grayscales for a third type of grayscales and a fourth type of grayscales in descending order of the target grayscales, wherein the third type of gray scales include target grayscales different from a previous target grayscale in brightness trend consistency and having inconsistent brightness trends, and the fourth type of grayscales include target grayscales different from a previous target grayscale in brightness trend consistency and having consistent brightness trends; and determine, in descending order of the target grayscales, an interval from a maximum grayscale in the high-brightness grayscale interval to the first one in the third type of grayscales, an interval from the fourth type of grayscales to the third type of grayscales adjacent thereto, and/or an interval from a minimum one in the fourth type of grayscales to a minimum grayscale to be the brightness trend consistency interval.

In some embodiments, the second calculation module 304 may be configured to obtain, for the target grayscales of the display panel that are within the brightness trend consistency interval, gain coefficients corresponding to the target grayscales within the brightness trend consistency interval by using the uniformity compensation algorithm; and calculate, by using the target grayscales within the brightness trend consistency interval and the gain coefficients corresponding to the target grayscales within the brightness trend consistency interval, a constant coefficient of a gain coefficient curve of the brightness trend consistency interval by fitting, and determine the constant coefficient to be the uniformity compensation coefficient.

In some examples, the display area of the display panel includes a plurality of sub-areas. Correspondingly, the gain coefficients corresponding to the target grayscales within the brightness trend consistency interval include gain coefficients corresponding to the target grayscales within the brightness trend consistency interval in the sub-areas, and the constant coefficient of the gain coefficient curve of the brightness trend consistency interval includes constant coefficients corresponding to the sub-areas.

In some examples, the target grayscales may include a selected grayscale to be specified for performing uniformity compensation on the display panel and a selected grayscale to be specified for performing Demura compensation on the display panel; or part of selected grayscales to be specified for performing uniformity compensation on the display panel and part of selected grayscales to be specified for performing Demura compensation on the display panel.

In some examples, the target grayscales include a maximum grayscale among grayscales specified for photographing during Demura compensation.

Figure 9:
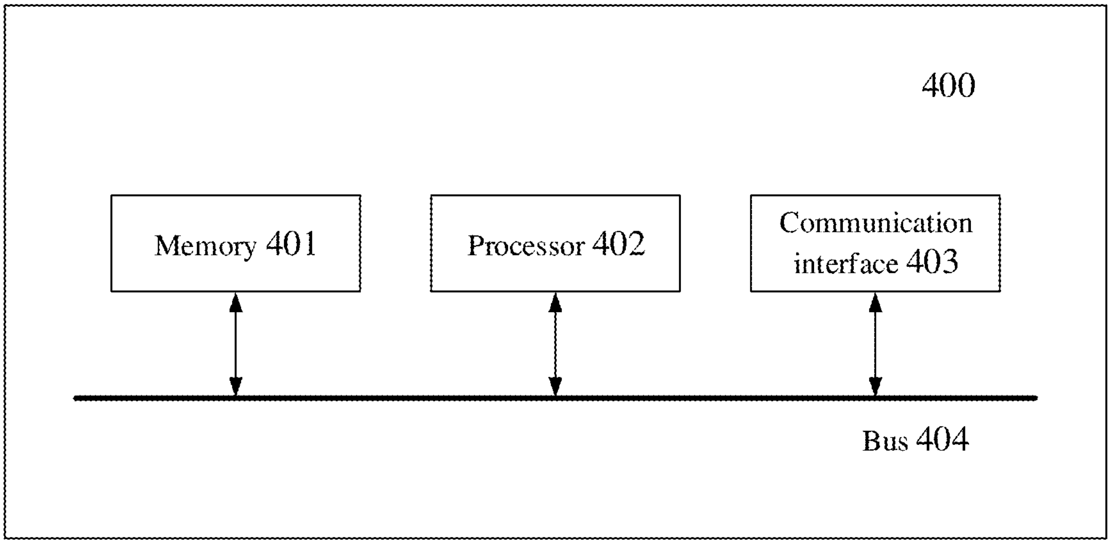
FIG. 9 is a schematic structural diagram of a display compensation device according to an embodiment of the present application.

In a fourth aspect of the present application, a display compensation device is further provided. FIG. 9 shows a display compensation device according to an embodiment of the present application. As shown in FIG. 9, a display compensation device 400 includes a memory 401, a processor 402, and a computer program that is stored in the memory 401 and executable by the processor 402.

In an example, the processor 402 may include a central processing unit (CPU), or an application specific integrated circuit (APIC), or one or more integrated circuits that may be configured to implement the embodiments of the present application.

The memory 401 may include a read-only memory (ROM), a random access memory (RAM), a magnetic disk storage media device, an optical storage media device, a flash memory device, electrical, optical, or other physical/tangible memory storage devices. Therefore, in general, the memory includes one or more tangible (non-transitory) computer-readable storage media (e.g., a memory device) encoded with software including computer-executable instructions, and when the software is executed (e.g., by the one or more processors), it is operable to perform the operations described with reference to the display compensation method in the embodiments in the first aspect of the present application.

The processor 402 executes, by reading executable program code stored in the memory 401, a computer program corresponding to the executable program code, so as to implement the display compensation method in the embodiments in the first aspect described above.

In an example, the display compensation device 400 may further include a communication interface 403 and a bus 404. As shown in FIG. 9, the memory 401, the processor 402, and the communication interface 403 are connected to and communicate with each other via the bus 404.

The communication interface 403 is mainly configured to implement communication between various modules, apparatuses, units, and/or devices in the embodiments of the present application. An input device and/or output device is also accessible via the communication interface 403.

The bus 404 includes hardware, software, or both, which couples components of the display compensation device 400 to each other. As an example and not by way of limitation, the bus 404 may include an accelerated graphics port (AGP) or other graphics bus, an enhanced industry standard architecture (EISA) bus, a front-side bus (FSB), a HyperTransport (HT) interconnect, an industry standard architecture (ISA) bus, an INFINIBAND interconnect, a low pin count (LPC) bus, a memory bus, a microchannel architecture (MCA) bus, a peripheral component interconnect (PCI) bus, a PCI-Express (PCI-E) bus, a serial advanced technology attachment (SATA) bus, a video electronics standards association local bus (VLB), or another suitable bus or a combination of two or more thereof. The bus 404 may include one or more buses, where appropriate. Although a particular bus is described and illustrated in the embodiments of the present application, any suitable bus or interconnect may be considered in the present application.

In a fifth aspect of the present application, a display apparatus is further provided. The display apparatus includes a driving IC. The driving IC stores the Demura compensation coefficient and the uniformity compensation coefficient obtained by the display compensation method in the embodiments in the first aspect. The driving IC is configured to read the Demura compensation coefficient and the uniformity compensation coefficient to perform the display compensation method in the embodiments in the second aspect. The display apparatus may specifically include apparatuses with a display function such as a mobile phone, a computer, a tablet computer, a television, and electronic paper, which is not limited herein.

In a sixth aspect of the present application, a computer-readable storage medium is further provided. The computer-readable storage medium stores computer program instructions thereon. The computer program instructions, when executed by a processor, may implement the display compensation method in the embodiments in the first aspect or the display compensation method in the embodiments in the second aspect, and the same technical effect can be achieved, which are not described in detail herein again in order to prevent repetition. The above computer-readable storage medium may include a non-transitory computer-readable storage medium such as a ROM, a RAM, a magnetic disk, an optical disk, and the like, which is not limited herein.

An embodiment of the present application further provides a computer program product. When instructions in the computer program product are executed by a processor of an electronic device, the electronic device is caused to implement the display compensation method in the embodiments in the first aspect or the display compensation method in the embodiments in the second aspect, and the same technical effect can be achieved, which are not described in detail herein again in order to prevent repetition.

It should be clear that, various embodiments in the specification are described in a progressive manner, and the same or similar parts of various embodiments may be referred to each other. Each embodiment focuses on the differences from other embodiments. For the embodiments of the apparatus, the device, the display panel, the display apparatus, the computer-readable storage medium, and the computer program product, relevant content may refer to the descriptions of the embodiments of the method. The present application is not limited to specific steps and structures described above and shown in the drawings. Those skilled in the art can make various changes, modifications and additions, or change the order between steps after understanding the gist of the present application. Moreover, for the sake of brevity, a detailed description of the known method and technology is omitted herein.

Aspects of the present application are described above with reference to flowcharts and/or block diagrams of methods, apparatuses (systems) and computer program products according to the embodiments of the present application. It should be understood that each block in the flowcharts and/or the block diagrams, and a combination of various blocks in the flowcharts and/or the block diagrams may be implemented by computer program instructions. These computer program instructions may be provided to a processor of a general-purpose computer, a special-purpose computer, or another programmable data processing apparatus to produce a machine such that execution of the instructions via the processor of the computer or the another programmable data processing apparatus enables the implementation of the functions/actions specified in one or more blocks of the flowcharts and/or the block diagrams. The processor may be, but is not limited to, a general-purpose processor, a-special purpose processor, an application specific processor, or a field programmable logic circuit. It should also be understood that each block in the block diagrams and/or the flowcharts, and the combination of various blocks in the block diagrams and/or the flowcharts may also be implemented by special-purpose hardware that performs specified functions or actions, or by the combination of the special-purpose hardware and computer instructions.

Those skilled in the art should understand that, the above embodiments are all illustrative rather than restrictive. Different technical features recited in different embodiments may be combined to achieve beneficial effects. Those skilled in the art should be able to understand and implement other modified embodiments of the disclosed embodiments on the basis of studying the drawings, the specification, and the claims. In the claims, the term "comprise" does not exclude other apparatuses or steps; the numeral word "a/an" does not exclude a plurality; and the terms "first" and "second" are used to indicate names and are not used to indicate any particular order. Any reference sign in the claims should not be construed as limiting the protection scope. The functions of several parts recited in the claims may be implemented by a single hardware or software module. Some technical features are recited in different dependent claims, which does not mean that these technical features cannot be combined to achieve beneficial effects.

The invention claimed is:

1. A display compensation method, comprising:

acquiring brightness parameters of two or more target grayscales in all grayscales of a display panel, and determining, based on the brightness parameters, target grayscales with consistent brightness trends and target grayscales with inconsistent brightness trends;

determining a brightness trend consistency interval of all the grayscales according to the target grayscales with consistent brightness trends and the target grayscales with inconsistent brightness trends;

calculating, for target grayscales in all the grayscales of the display panel, a Demura compensation coefficient by using a Demura compensation algorithm;

calculating, for target grayscales of the display panel that are within the brightness trend consistency interval, a uniformity compensation coefficient by using a uniformity compensation algorithm; and writing the Demura compensation coefficient and the uniformity compensation coefficient into a driving integrated circuit, the driving integrated circuit reading the Demura compensation coefficient and the uniformity compensation coefficient according to a displayed grayscale to perform compensation;

wherein the target grayscales comprise a maximum grayscale, and the determining a brightness trend consistency interval of all the grayscales according to the target grayscales with consistent brightness trends and the target grayscales with inconsistent brightness trends comprises:

searching the target grayscales for a first target grayscale in descending order of the target grayscales, the first target grayscale being a first target grayscale with an inconsistent brightness trend; and determining the brightness trend consistency interval according to the first target grayscale, an upper limit value of the brightness trend consistency interval being the maximum grayscale, and a lower limit value of the brightness trend consistency interval being the first target grayscale.

2. The method of claim 1, wherein the target grayscales comprise a maximum grayscale, and the determining, based on the brightness parameters, target grayscales with consistent brightness trends and target grayscales with inconsistent brightness trends comprises:

dividing a display area of the display panel into $N_1$ sub-areas, $N_1$ being an integer greater than or equal to 2;

determining, based on brightness parameters of the $N_1$ sub-areas, brightness representation values of different target grayscales of each sub-area in the $N_1$ sub-areas;

acquiring a first difference value between a brightness representation value of a target grayscale and a brightness representation value of the maximum grayscale in each sub-area;

determining the target grayscale to be a target grayscale with an inconsistent brightness trend in a case where a number of sub-areas with the first difference value greater than or equal to a first consistency threshold satisfies a first preset condition; and determining the target grayscale to be a target grayscale with an consistent brightness trend in a case where the number of sub-areas with the first difference value greater than or equal to the first consistency threshold does not satisfy the first preset condition.

3. The method of claim 2, wherein the brightness representation value is determined according to the brightness parameter of the sub-area and a reference brightness parameter corresponding to the target grayscale.

4. The method of claim 3, wherein the reference brightness parameter comprises a pre-specified brightness parameter or a brightness parameter of any of the sub-areas.

5. The method of claim 1, wherein the target grayscales comprise a maximum grayscale, and the determining, based on the brightness parameters, target grayscales with consistent brightness trends and target grayscales with inconsistent brightness trends comprises:

dividing a display area of the display panel into $N_2$ sub-areas, $N_2$ being an integer greater than or equal to 2;

determining, based on brightness parameters of the $N_2$ sub-areas, brightness representation values of different target grayscales of each sub-area in the $N_2$ sub-areas, and a brightness representation value of a first display color and a brightness representation value of a second display color of each sub-area at a same target grayscale, the first display color being white, and the second display color being at least one of red, green, and blue;

acquiring a second difference value between a brightness representation value of a target grayscale and a brightness representation value of the maximum grayscale in each sub-area, and a third difference value between the brightness representation value of the first display color and the brightness representation value of the second display color of each sub-area at the same target grayscale;

determining the target grayscale to be a target grayscale with an inconsistent brightness trend in a case where a number of sub-areas with the second difference value exceeding a second consistency threshold satisfies a second preset condition or a number of sub-areas with the third difference value exceeding a third consistency threshold satisfies a third preset condition; and determining the target grayscale to be a target grayscale with a consistent brightness trend in a case where the number of sub-areas with the second difference value exceeding the second consistency threshold does not satisfy the second preset condition or the number of sub-areas with the third difference value exceeding the third consistency threshold does not satisfy the third preset condition.

6. The method of claim 1, further comprising:

acquiring a new target grayscale with a smaller value in a case where the target grayscales do not comprise the first target grayscale; and determining whether a brightness trend of the acquired new target grayscale is consistent until the first target grayscale is acquired.

7. The method of claim 1, wherein the searching the target grayscales for a first target grayscale in descending order of the target grayscales comprises:

selecting a plurality of candidate grayscales from all the grayscales, and taking the candidate grayscales as the target grayscales; and determining, in descending order of the target grayscales, sequentially whether brightness trends of the candidate grayscales are consistent until the first target grayscale is acquired.

8. The method of claim 1, wherein the target grayscales comprise a maximum grayscale, and the determining a brightness trend consistency interval of all the grayscales according to the target grayscales with consistent brightness trends and the target grayscales with inconsistent brightness trends comprises:

searching the target grayscales for a first type of grayscales and a second type of grayscales in descending order of the target grayscales, wherein the first type of gray scales comprise target grayscales with brightness trends that are inconsistent and different from a brightness trend of a previous target grayscale, and the second type of grayscales comprise target grayscales with brightness trends that are consistent and different from a brightness trend of a previous target grayscale; and determining, in descending order of the target grayscales, an interval from the maximum grayscale to the first one in the first type of grayscales, an interval from the second type of grayscales to the first type of grayscales adjacent thereto, and/or an interval from a minimum one in the second type of grayscales to a minimum grayscale to be the brightness trend consistency interval.

9. The method of claim 1, wherein the target grayscales comprise a maximum grayscale, and the determining a brightness trend consistency interval of all the grayscales according to the target grayscales with consistent brightness trends and the target grayscales with inconsistent brightness trends comprises:

acquiring a high-brightness grayscale interval;

searching, in the high-brightness grayscale interval, the target grayscales for a third type of grayscales and a fourth type of grayscales in descending order of the target grayscales, wherein the third type of gray scales comprise target grayscales with inconsistent brightness trends and different from a previous target grayscale in brightness trend consistency, and the fourth type of grayscales comprise target grayscales with consistent brightness trends and different from a previous target grayscale in brightness trend consistency; and determining, in descending order of the target grayscales, an interval from a maximum grayscale in the high-brightness grayscale interval to the first one in the third type of grayscales, an interval from the fourth type of grayscales to the third type of grayscales adjacent thereto, and/or an interval from a minimum one in the fourth type of grayscales to a minimum grayscale to be the brightness trend consistency interval.

10. The method of claim 9, wherein the minimum grayscale comprises a minimum grayscale value in all the grayscales or a minimum grayscale value in the high-brightness grayscale interval.

11. The method of claim 1, wherein the calculating, for target grayscales of the display panel that are within the brightness trend consistency interval, a uniformity compensation coefficient by using a uniformity compensation algorithm comprises:

obtaining, for the target grayscales of the display panel that are within the brightness trend consistency interval, gain coefficients corresponding to the target grayscales within the brightness trend consistency interval by using the uniformity compensation algorithm; and calculating, by using the target grayscales within the brightness trend consistency interval and the gain coefficients corresponding to the target grayscales within the brightness trend consistency interval, a constant coefficient of a gain coefficient curve of the brightness trend consistency interval by fitting, and determining the constant coefficient to be the uniformity compensation coefficient.

12. The method of claim 11, wherein a display area of the display panel comprises a plurality of sub-areas, and the gain coefficients corresponding to the target grayscales within the brightness trend consistency interval comprise gain coefficients corresponding to the target grayscales within the brightness trend consistency interval in the sub-areas, and the constant coefficient of the gain coefficient curve of the brightness trend consistency interval comprises constant coefficients corresponding to the sub-areas.

13. The method of claim 1, wherein the target grayscales comprise:

a selected grayscale to be specified for performing uniformity compensation on the display panel and a selected grayscale to be specified for performing Demura compensation on the display panel;

or part of selected grayscales to be specified for performing uniformity compensation on the display panel and part of selected grayscales to be specified for performing Demura compensation on the display panel.

14. The method of claim 13, wherein the target grayscales comprise a maximum grayscale among grayscales specified for photographing during Demura compensation.

15. A display compensation method, applied to a driving integrated circuit in a display apparatus, the driving integrated circuit storing the Demura compensation coefficient and the uniformity compensation coefficient obtained by the display compensation method of claim 1, the method comprising:

determining the displayed grayscale based on a display signal;

reading, in a case where the displayed grayscale comprises a grayscale within the brightness trend consistency interval, the Demura compensation coefficient and the uniformity compensation coefficient that are stored, and compensating for the display signal according to the displayed grayscale, the Demura compensation coefficient, and the uniformity compensation coefficient; and reading, in a case where the displayed grayscale does not comprise the grayscale within the brightness trend consistency interval, the stored Demura compensation coefficient, and compensating for the display signal according to the displayed grayscale and the Demura compensation coefficient.

16. A computer-readable storage medium having stored computer program instructions thereon, wherein the computer program instructions, when executed by a processor, implement the display compensation method of claim 1.

* * * * *